United States Patent
Zhang et al.

(10) Patent No.: US 10,763,488 B2
(45) Date of Patent: Sep. 1, 2020

(54) OVERCHARGE PROTECTION ASSEMBLY FOR A BATTERY MODULE

(71) Applicant: CPS Technology Holdings LLC, New York, NY (US)

(72) Inventors: Xugang Zhang, Milwaukee, WI (US); Jason D. Fuhr, Sussex, WI (US); Peter A. Selthafner, Oostburg, WI (US); David R. Boone, Waukesha, WI (US)

(73) Assignee: CPS Technology Holdings LLC, New York, NY (US)

( * ) Notice: Subject to any disclaimer, the term of this patent is extended or adjusted under 35 U.S.C. 154(b) by 158 days.

(21) Appl. No.: 16/017,384

(22) Filed: Jun. 25, 2018

(65) Prior Publication Data
US 2018/0375085 A1    Dec. 27, 2018

Related U.S. Application Data

(62) Division of application No. 14/794,530, filed on Jul. 8, 2015, now Pat. No. 10,008,710.
(Continued)

(51) Int. Cl.
*H01M 2/34* (2006.01)
*H01M 2/30* (2006.01)
(Continued)

(52) U.S. Cl.
CPC ........... *H01M 2/345* (2013.01); *H01M 2/043* (2013.01); *H01M 2/1241* (2013.01);
(Continued)

(58) Field of Classification Search
CPC ......... H01M 10/0525; H01M 2200/20; H01M 2220/20; H01M 2/027; H01M 2/0285;
(Continued)

(56) References Cited

U.S. PATENT DOCUMENTS

| 5,304,431 A | 4/1994 | Schumm, Jr. |
| 5,707,756 A | 1/1998 | Inoue et al. |

(Continued)

FOREIGN PATENT DOCUMENTS

| CN | 1841832 A | 10/2006 |
| CN | 102005597 A | 4/2011 |

(Continued)

OTHER PUBLICATIONS

PCT/US2015/046639 International Search Report and Written Opinion dated May 27, 2016.
(Continued)

*Primary Examiner* — Carlos Barcena
(74) *Attorney, Agent, or Firm* — Boardman & Clark LLP

(57) ABSTRACT

The present disclosure includes a lithium-ion battery module that has a housing and a plurality of lithium-ion battery cells disposed in the housing. Each of the plurality of lithium-ion battery cells includes a first terminal with a first polarity, a second terminal with a second polarity opposite to the first polarity, an overcharge protection assembly, and a casing electrically coupled to the first terminal such that the casing has the first polarity, where the casing has an electrically conductive material. The lithium-ion battery module also includes a vent of the overcharge protection assembly electrically coupled to the casing and a conductive component of the overcharge protection assembly electrically coupled to the second terminal, and the vent is configured to contact the conductive component to cause a short circuit and to vent a gas from the casing into the housing when a pressure in the casing reaches a threshold value.

5 Claims, 13 Drawing Sheets

Related U.S. Application Data

(60) Provisional application No. 62/033,001, filed on Aug. 4, 2014.

(51) Int. Cl.
*H01M 2/12* (2006.01)
*H01M 2/04* (2006.01)
*H01M 2/02* (2006.01)
*H01M 10/0525* (2010.01)

(52) U.S. Cl.
CPC .......... *H01M 2/027* (2013.01); *H01M 2/0285* (2013.01); *H01M 2/0473* (2013.01); *H01M 2/305* (2013.01); *H01M 10/0525* (2013.01); *H01M 2200/20* (2013.01); *H01M 2220/20* (2013.01); *Y02E 60/122* (2013.01); *Y02P 70/54* (2015.11)

(58) Field of Classification Search
CPC ...... H01M 2/043; H01M 2/0473; H01M 2/12; H01M 2/1235; H01M 2/1241; H01M 2/305; H01M 2/34; H01M 2/345
See application file for complete search history.

(56) References Cited

U.S. PATENT DOCUMENTS

| | | |
|---|---|---|
| 5,741,606 A | 4/1998 | Mayer et al. |
| 5,766,791 A | 6/1998 | Takahashi et al. |
| 6,037,071 A | 3/2000 | Poirier et al. |
| 6,210,824 B1 | 4/2001 | Sullivan et al. |
| 6,342,826 B1 | 1/2002 | Quinn et al. |
| 6,900,616 B2 | 5/2005 | Burrus, IV et al. |
| 7,433,794 B1 | 10/2008 | Berdichevsky et al. |
| 7,501,197 B2 | 3/2009 | Kim |
| 7,763,375 B2 | 7/2010 | Igoris et al. |
| 7,879,484 B2 | 2/2011 | Hyung et al. |
| 8,409,736 B2 | 4/2013 | Wang et al. |
| 8,435,660 B2 | 5/2013 | Kim et al. |
| 8,632,911 B2 | 1/2014 | Byun et al. |
| 8,697,269 B2 | 4/2014 | Yamashita et al. |
| 8,748,030 B2 | 6/2014 | Byun |
| 9,012,050 B2 | 4/2015 | Byun et al. |
| 9,099,732 B2 | 8/2015 | Kim et al. |
| 9,190,636 B2 | 11/2015 | Kim |
| 9,324,990 B2 | 4/2016 | Han |
| 9,425,453 B2 | 8/2016 | Han et al. |
| 9,490,468 B2 | 11/2016 | Byun et al. |
| 2010/0291422 A1 | 11/2010 | Deng et al. |
| 2011/0039136 A1 | 2/2011 | Byun et al. |
| 2011/0052949 A1 | 3/2011 | Byun et al. |
| 2011/0070467 A1 | 3/2011 | Meintschel et al. |
| 2013/0130072 A1 | 5/2013 | Guen |
| 2013/0337297 A1 | 12/2013 | Lee et al. |
| 2014/0162092 A1 | 6/2014 | Reitzle |
| 2014/0186666 A1 | 7/2014 | Elia et al. |
| 2014/0377600 A1 | 12/2014 | Guen |
| 2014/0377601 A1 | 12/2014 | Kim |
| 2014/0377603 A1 | 12/2014 | Eberle et al. |
| 2015/0270528 A1 | 9/2015 | Guen |

FOREIGN PATENT DOCUMENTS

| | | |
|---|---|---|
| CN | 104716394 A | 6/2015 |
| EP | 1076350 A2 | 2/2001 |
| KR | 20080050642 | 6/2008 |
| WO | 2016/018871 A1 | 4/2016 |

OTHER PUBLICATIONS

China Patent Office, Application No. 201580051428.1, First Office Action dated Apr. 2, 2019, (Chinese language), 9 pages.

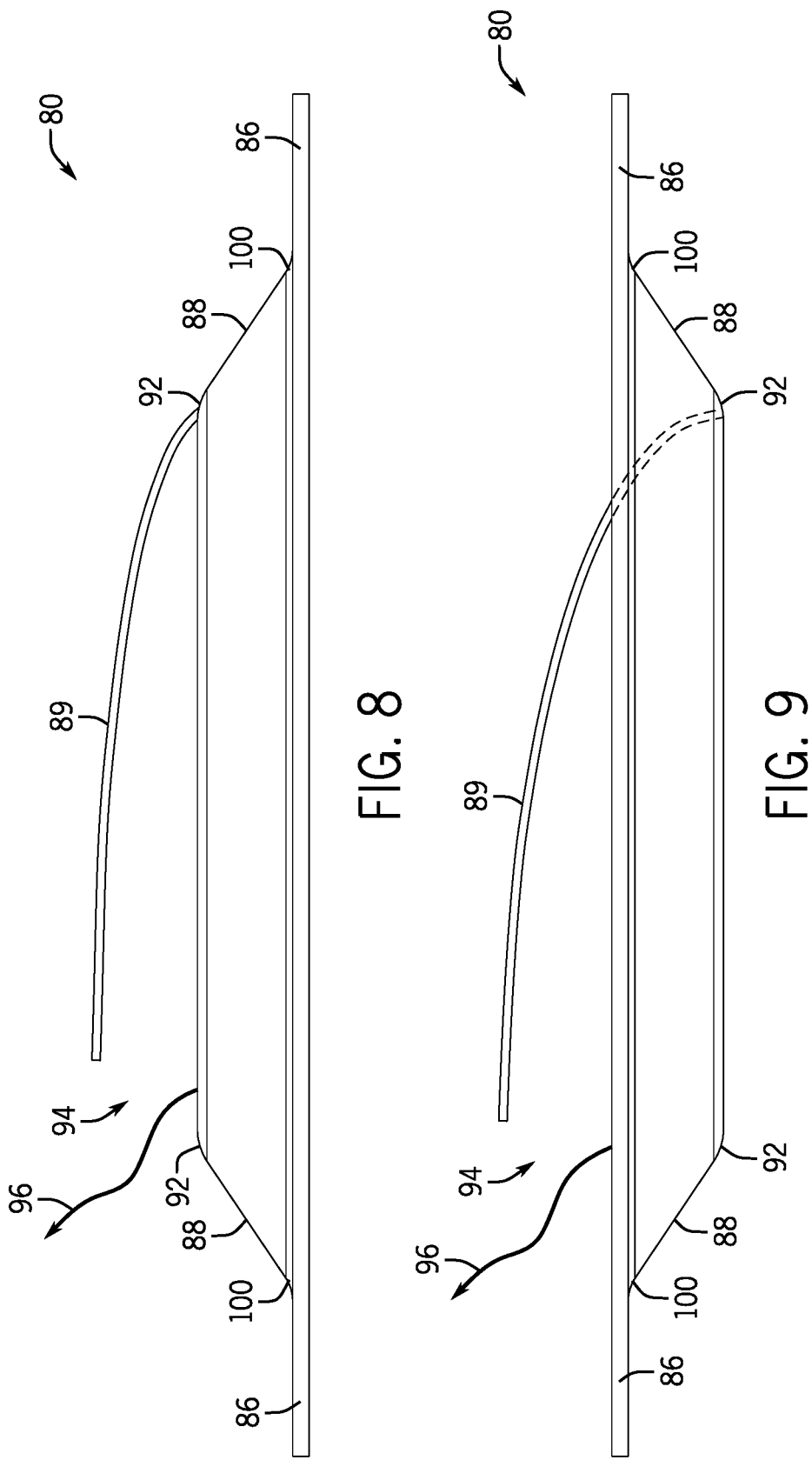

OVERCHARGE PROTECTION ASSEMBLY FOR A BATTERY MODULE

CROSS REFERENCE TO RELATED APPLICATIONS

This application is a divisional of U.S. patent application Ser. No. 14/794,530, entitled "OVERCHARGE PROTECTION ASSEMBLY FOR A BATTERY MODULE," filed Jul. 8, 2015, which claims priority from and the benefit of U.S. Provisional Application Ser. No. 62/033,001, entitled "AN OVERCHARGE PROTECTION DEVICE," filed Aug. 4, 2014, which are hereby incorporated by reference.

BACKGROUND

The present disclosure relates generally to the field of batteries and battery modules. More specifically, the present disclosure relates to features of a battery cell that may protect a battery module from thermal runaway during an overcharge event.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

A vehicle that uses one or more battery systems for providing all or a portion of the motive power for the vehicle can be referred to as an xEV, where the term "xEV" is defined herein to include all of the following vehicles, or any variations or combinations thereof, that use electric power for all or a portion of their vehicular motive force. For example, xEVs include electric vehicles (EVs) that utilize electric power for all motive force. As will be appreciated by those skilled in the art, hybrid electric vehicles (HEVs), also considered xEVs, combine an internal combustion engine propulsion system and a battery-powered electric propulsion system, such as 48 Volt (V) or 130V systems. The term HEV may include any variation of a hybrid electric vehicle. For example, full hybrid systems (FHEVs) may provide motive and other electrical power to the vehicle using one or more electric motors, using only an internal combustion engine, or using both. In contrast, mild hybrid systems (MHEVs) disable the internal combustion engine when the vehicle is idling and utilize a battery system to continue powering the air conditioning unit, radio, or other electronics, as well as to restart the engine when propulsion is desired. The mild hybrid system may also apply some level of power assist, during acceleration for example, to supplement the internal combustion engine. Mild hybrids are typically 96V to 130V and recover braking energy through a belt or crank integrated starter generator. Further, a micro-hybrid electric vehicle (mHEV) also uses a "Stop-Start" system similar to the mild hybrids, but the micro-hybrid systems of a mHEV may or may not supply power assist to the internal combustion engine and operates at a voltage below 60V. For the purposes of the present discussion, it should be noted that mHEVs typically do not technically use electric power provided directly to the crankshaft or transmission for any portion of the motive force of the vehicle, but an mHEV may still be considered an xEV since it does use electric power to supplement a vehicle's power needs when the vehicle is idling with internal combustion engine disabled and recovers braking energy through an integrated starter generator. In addition, a plug-in electric vehicle (PEV) is any vehicle that can be charged from an external source of electricity, such as wall sockets, and the energy stored in the rechargeable battery packs drives, or contributes to drive, the wheels. PEVs are a subcategory of EVs that include all-electric or battery electric vehicles (BEVs), plug-in hybrid electric vehicles (PHEVs), and electric vehicle conversions of hybrid electric vehicles and conventional internal combustion engine vehicles.

xEVs as described above may provide a number of advantages as compared to more traditional gas-powered vehicles using only internal combustion engines and traditional electrical systems, which are typically 12V systems powered by a lead acid battery. For example, xEVs may produce fewer undesirable emission products and may exhibit greater fuel efficiency as compared to traditional internal combustion vehicles and, in some cases, such xEVs may eliminate the use of gasoline entirely, as is the case of certain types of EVs or PEVs.

As technology continues to evolve, there is a need to provide improved power sources, particularly battery modules, for such vehicles. For example, battery modules may undergo overcharge testing to determine boundaries and/or limits of the battery module and its individual battery cells. Additionally, in certain instances, for example due to changing environmental conditions or other operating conditions, battery cells may be subject to overcharging. Overcharge tests and overcharging may lead to thermal runaway (e.g., an internal short circuit) caused by overheating in the battery cells. Thermal runaway may render the battery cell and an associated battery module permanently inoperable. Therefore, devices that may prevent or block thermal runaway are desired.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure relates to a lithium-ion battery module that has a housing and a lithium-ion plurality of battery cells disposed in the housing. Each of the plurality of lithium-ion battery cells includes a first terminal with a first polarity, a second terminal with a second polarity opposite the first polarity, an overcharge protection assembly, and a casing electrically coupled to the first terminal such that the casing has the first polarity, where the casing has an electrically conductive material. The lithium-ion battery module includes a vent of the overcharge protection assembly electrically coupled to the casing and a conductive component of the overcharge protection assembly electrically coupled to the second terminal, and the vent is configured to contact the conductive component to cause a short circuit and to vent a gas from the casing into the housing when a pressure in the casing reaches a threshold value.

The present disclosure also relates to a battery module that includes a plurality of battery cells disposed in a housing. Each of the plurality of battery cells has a casing that includes an electrically conductive material, a first terminal electrically coupled to the casing, a second terminal, a vent, a conductive spring electrically coupled to the second terminal, and an insulative component disposed between the conductive spring and the casing. The vent is configured to vent a gas from the casing into the housing and to urge the insulative component from between the conductive spring and the casing such that the conductive spring electrically contacts the casing when a pressure in the casing exceeds a threshold value.

The present disclosure also relates to a lithium ion battery cell that includes a first terminal with a first polarity, a second terminal of with a second polarity opposite the first polarity, a casing coupled to the first terminal and having an electrically conductive material such that the casing has the first polarity, and an overcharge protection assembly having a vent, a first conductive component, an intermediate conductive component, and an insulating component. The first conductive component is electrically coupled to the second terminal, the intermediate conductive component is electrically coupled to the casing, the insulating component is positioned between the first conductive component and the casing such that a gap is formed between the first conductive component and the casing, and the vent is configured to vent a gas from the casing and to urge the intermediate conductive component to span the gap and to contact the first conductive component when a pressure in the casing reaches a threshold value such that a short circuit occurs.

DRAWINGS

Various aspects of this disclosure may be better understood upon reading the following detailed description and upon reference to the drawings in which:

FIG. 8 is an elevational view of the vent disk of FIGS. 4-7 in the second position when a recessed surface of the vent disk is inverted, in accordance with an aspect of the present disclosure;

FIG. 9 is an elevational view of the vent disk of FIGS. 4-8 in the second position and depicting an example of the manner in which the recessed surface is configured to remain substantially rigid, in accordance with an aspect of the present disclosure;

DETAILED DESCRIPTION

Figure 1:
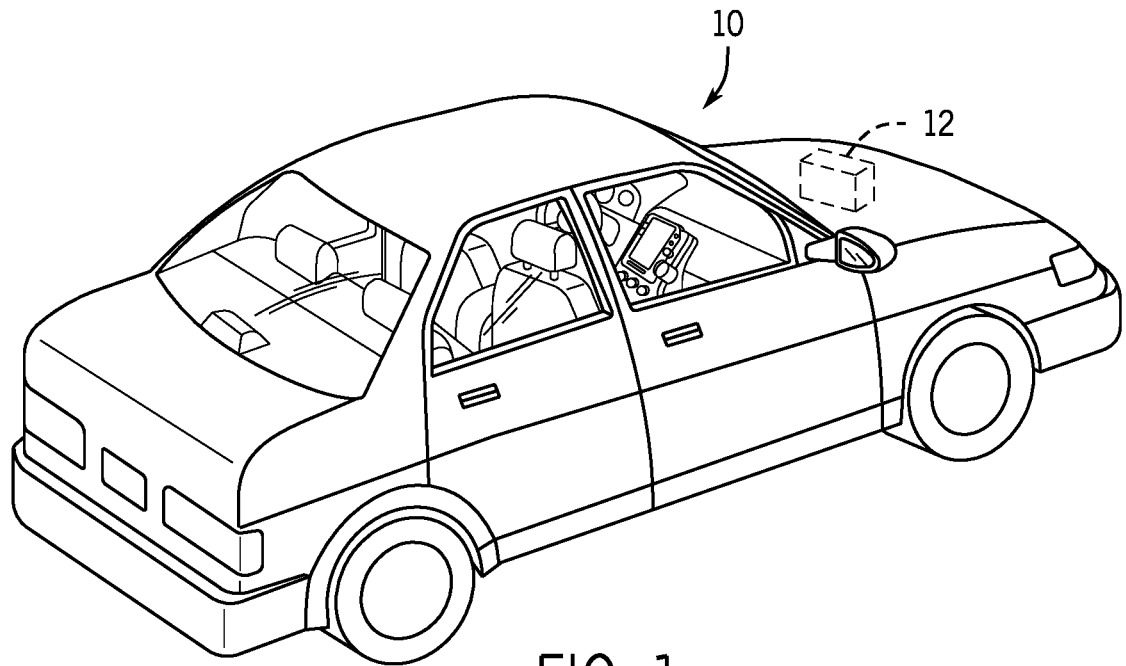
FIG. 1 is a perspective view of a vehicle having a battery system configured in accordance with present embodiments to provide power for various components of the vehicle.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The battery systems described herein may be used to provide power to various types of electric vehicles (xEVs) and other high voltage energy storage/expending applications (e.g., electrical grid power storage systems). Such battery systems may include one or more battery modules, each battery module having a number of battery cells (e.g., Lithium-ion (Li-ion) electrochemical cells) arranged to provide particular voltages and/or currents useful to power, for example, one or more components of an xEV. As another example, battery modules in accordance with present embodiments may be incorporated with or provide power to stationary power systems (e.g., non-automotive systems).

During the design and manufacturing process of a battery module, various tests may be performed upon the battery module and its individual battery cells to determine optimal performance parameters. For example, overcharge tests may provide excess electrical current to an individual battery cell of a battery module using a power supply with a voltage that exceeds a voltage of the individual battery cell. Overcharge testing may provide data related to temperature, heat output, and/or voltage of the overcharged battery cell, which may enable designers or manufacturers to modify various components of the battery cell to enhance performance (e.g., minimize damage to an overcharged battery cell). Therefore, such tests may be desirable for providing information that may enable manufacturers to optimize a battery module. In addition to overcharge testing, battery cells may be overcharged as a result of environmental conditions or abnormal operating parameters.

In certain cases, overcharging a battery cell may lead to thermal runaway (e.g., an internal short circuit) or another event causing permanent damage to the battery cell. For instance, charging a battery cell may generate dendrites as a result of intercalation of positive ions in the anode. Thermal runaway may result due to an excess buildup of dendrites on a separator of a battery cell (e.g., the dendrites may penetrate the separator enabling mixing of the positive electrode and the negative electrode) when the battery cell is overcharged (e.g., from an overcharge test or under abnormal operating conditions). Thermal runaway may be undesirable because it generates excessive heat, which may cause permanent damage to the battery cell and/or render the battery cell permanently inoperable.

Various features may be included in the battery cell that prevent or block thermal runaway when the battery cell is overcharged. Some battery cells may include a mechanism that completely breaks (e.g., disrupts a flow of electrical current) an electrical connection to at least one terminal of the battery cell when a pressure in the battery cell reaches a certain level. Such a mechanism thereby disrupts current flow to at least one terminal of the battery cell, which may ultimately lead to decreased current capacity of the battery cell. However, it is now recognized that it may be desirable to maintain the electrical connection to one or both terminals of the battery cell while preventing thermal runaway during overcharge. In accordance with aspects of the present disclosure, when a pressure in the battery cell exceeds a threshold level, an external short circuit may be triggered by electrically coupling the positive terminal and the negative terminal of the battery cell via a casing of the battery cell, for example. Accordingly, thermal runaway may be prevented and an electrical current capacity of the battery cell terminals is not reduced because the electrical pathway (e.g., connection) from an external load to the terminals remains intact.

Certain embodiments of the present disclosure relate to an overcharge protection assembly for battery modules having battery cells with polarized cans (e.g., casings). As used herein a "polarized can" may be defined as a battery cell casing which is electrically coupled to the positive terminal or the negative terminal (e.g., the positive terminal or the negative terminal contacts the battery cell casing). Conversely, other embodiments of the present disclosure relate to an overcharge protection assembly for battery cells with a neutral can. As used herein, a "neutral can" may be defined as a battery cell casing that is not electrically coupled to either the positive terminal or the negative terminal of the individual battery cell.

To help illustrate, FIG. 1 is a perspective view of an embodiment of a vehicle 10, which may utilize a regenerative braking system. Although the following discussion is presented in relation to vehicles with regenerative braking systems, the techniques described herein are adaptable to other vehicles that capture/store electrical energy with a battery, which may include electric-powered and gas-powered vehicles.

As discussed above, it would be desirable for a battery system 12 to be largely compatible with traditional vehicle designs. Accordingly, the battery system 12 may be placed in a location in the vehicle 10 that would have housed a traditional battery system. For example, as illustrated, the vehicle 10 may include the battery system 12 positioned similarly to a lead-acid battery of a typical combustion-engine vehicle (e.g., under the hood of the vehicle 10). Furthermore, as will be described in more detail below, the battery system 12 may be positioned to facilitate managing temperature of the battery system 12. For example, in some embodiments, positioning a battery system 12 under the hood of the vehicle 10 may enable an air duct to channel airflow over the battery system 12 and cool the battery system 12.

Figure 2:
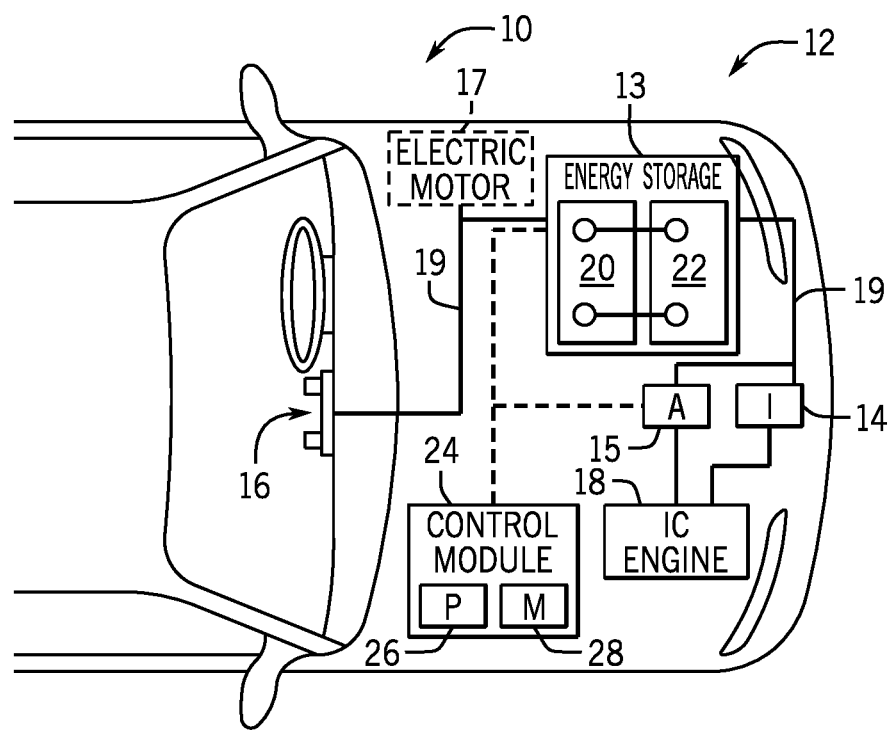
FIG. 2 is a cutaway schematic view of an embodiment of the vehicle and the battery system of FIG. 1.

A more detailed view of the battery system 12 is described in FIG. 2. As depicted, the battery system 12 includes an energy storage component 13 coupled to an ignition system 14, an alternator 15, a vehicle console 16, and optionally to an electric motor 17. Generally, the energy storage component 13 may capture/store electrical energy generated in the vehicle 10 and output electrical energy to power electrical devices in the vehicle 10.

In other words, the battery system 12 may supply power to components of the vehicle's electrical system, which may include radiator cooling fans, climate control systems, electric power steering systems, active suspension systems, auto park systems, electric oil pumps, electric super/turbochargers, electric water pumps, heated windscreen/defrosters, window lift motors, vanity lights, tire pressure monitoring systems, sunroof motor controls, power seats, alarm systems, infotainment systems, navigation features, lane departure warning systems, electric parking brakes, external lights, or any combination thereof. Illustratively, in the depicted embodiment, the energy storage component 13 supplies power to the vehicle console 16 and the ignition system 14, which may be used to start (e.g., crank) an internal combustion engine 18.

Additionally, the energy storage component 13 may capture electrical energy generated by the alternator 15 and/or the electric motor 17. In some embodiments, the alternator 15 may generate electrical energy while the internal combustion engine 18 is running. More specifically, the alternator 15 may convert the mechanical energy produced by the rotation of the internal combustion engine 18 into electrical energy. Additionally or alternatively, when the vehicle 10 includes an electric motor 17, the electric motor 17 may generate electrical energy by converting mechanical energy produced by the movement of the vehicle 10 (e.g., rotation of the wheels) into electrical energy. Thus, in some embodiments, the energy storage component 13 may capture electrical energy generated by the alternator 15 and/or the electric motor 17 during regenerative braking. As such, the alternator 15 and/or the electric motor 17 are generally referred to herein as a regenerative braking system.

To facilitate capturing and supplying electric energy, the energy storage component 13 may be electrically coupled to the vehicle's electric system via a bus 19. For example, the bus 19 may enable the energy storage component 13 to receive electrical energy generated by the alternator 15 and/or the electric motor 17. Additionally, the bus 19 may enable the energy storage component 13 to output electrical energy to the ignition system 14 and/or the vehicle console 16. Accordingly, when a 12 volt battery system 12 is used, the bus 19 may carry electrical power typically between 8-18 volts.

Additionally, as depicted, the energy storage component 13 may include multiple battery modules. For example, in the depicted embodiment, the energy storage component 13 includes a lithium ion (e.g., a first) battery module 20 and a lead-acid (e.g., a second) battery module 22, which each includes one or more battery cells. In other embodiments, the energy storage component 13 may include any number of battery modules. Additionally, although the lithium ion battery module 20 and lead-acid battery module 22 are depicted adjacent to one another, they may be positioned in different areas around the vehicle. For example, the lead-acid battery module 22 may be positioned in or about the interior of the vehicle 10 while the lithium ion battery module 20 may be positioned under the hood of the vehicle 10.

In some embodiments, the energy storage component 13 may include multiple battery modules to utilize multiple different battery chemistries. For example, when the lithium ion battery module 20 is used, performance of the battery system 12 may be improved since the lithium ion battery chemistry generally has a higher coulombic efficiency and/or a higher power charge acceptance rate (e.g., higher maximum charge current or charge voltage) than the lead-acid battery chemistry. As such, the capture, storage, and/or distribution efficiency of the battery system 12 may be improved.

To facilitate controlling the capturing and storing of electrical energy, the battery system 12 may additionally include a control module 24. More specifically, the control module 24 may control operations of components in the battery system 12, such as relays (e.g., switches) within energy storage component 13, the alternator 15, and/or the electric motor 17. For example, the control module 24 may regulate an amount of electrical energy captured/supplied by each battery module 20 or 22 (e.g., to de-rate and re-rate the battery system 12), perform load balancing between the battery modules 20 and 22, determine a state of charge of each battery module 20 or 22, determine temperature of each battery module 20 or 22, control voltage output by the alternator 15 and/or the electric motor 17, and the like.

Accordingly, the control module 24 may include one or more processors 26 and one or more memory components 28. More specifically, the one or more processors 26 may include one or more application specific integrated circuits (ASICs), one or more field programmable gate arrays (FPGAs), one or more general purpose processors, or any combination thereof. Additionally, the one or more memory components 28 may include volatile memory, such as random access memory (RAM), and/or non-volatile memory, such as read-only memory (ROM), optical drives, hard disc drives, or solid-state drives. In some embodiments, the control module 24 may include portions of a vehicle control unit (VCU) and/or a separate battery control module.

As discussed above, before a battery module may be used to supply power to an xEV, various tests may be conducted upon the battery module and its individual battery cells to optimize operating parameters of the battery module. One such test may be an overcharge test that determines how much electrical current a battery cell may receive, or how long a battery cell may receive an electrical current, before damage occurs to the battery cell. However, in certain instances, overcharge tests may result in thermal runaway (e.g., an internal short circuit within the battery cell), which may cause permanent damage to the battery cell because of excess heat generated from the overcharge. It is now recognized that it may be desirable to prevent thermal runaway (e.g., an internal short circuit) by triggering an external short circuit (e.g., electrically coupling the positive terminal and the negative terminal of the battery cell) before thermal runaway occurs. In certain embodiments, the external short circuit may be triggered by establishing an electrical connection between an insulated terminal of the battery cell and the cell casing (e.g., can) such that the insulated terminal is electrically coupled to a non-insulated terminal (e.g., the terminal directly contacting the casing) via the casing.

Figure 3:
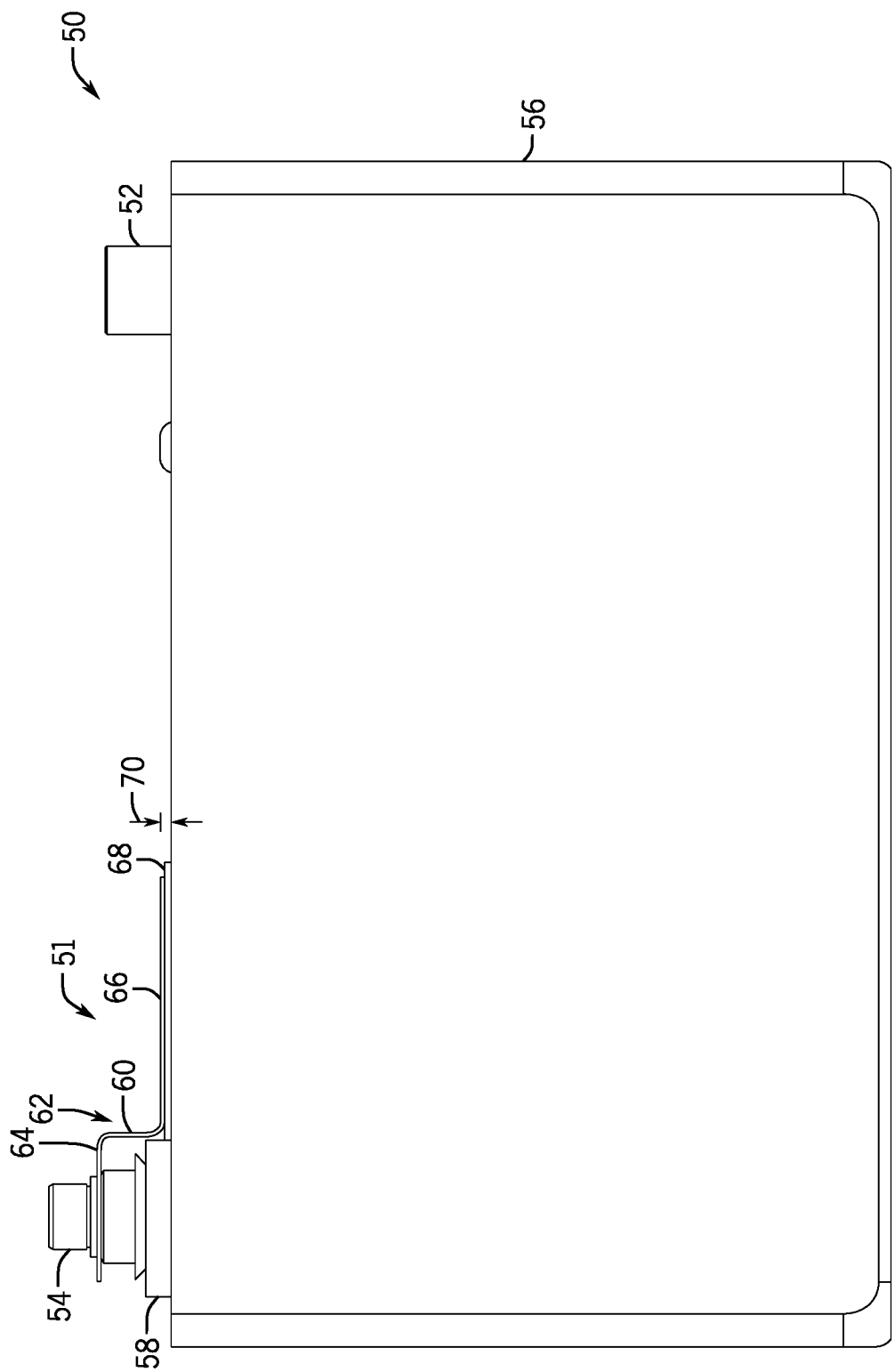
FIG. 3 is an elevational view of a lithium-ion battery cell that includes an overcharge protection assembly, in accordance with an aspect of the present disclosure.

FIG. 3 is an illustration of a prismatic, lithium-ion battery cell 50 that includes an overcharge protection assembly 51. The battery cell 50 may be used in the lithium-ion battery module 20 that supplies power to an xEV 10. It should be noted that while the current discussion focuses on an overcharge protection assembly in a lithium-ion battery cell, embodiments of the overcharge protection assembly may be employed in any suitable battery cell that may be subject to overcharge.

As shown in the illustrated embodiment of FIG. 3, the battery cell 50 includes a positive (e.g., first) terminal 52 and a negative (e.g., second) terminal 54. The positive terminal 52 has a first polarity (e.g., positive polarity) and the negative terminal 54 has a second polarity (e.g., negative polarity), where the second polarity (e.g., negative polarity) is opposite to the first polarity (e.g., positive polarity) of the positive terminal 52. Additionally, the battery cell 50 includes a casing 56. The casing 56 may house various chemicals and other components that enable the battery cell 50 to supply electrical power to a load (e.g., an xEV). In certain embodiments, the casing 56 may include an electrically conductive material. When the casing includes an electrically conductive material, the battery cell casing may or may not be polarized (e.g., when polarized, the casing 56 is electrically coupled to the positive terminal 52 or the negative terminal 54, thereby having the first or second polarity). In the illustrated embodiment of FIG. 3, the casing 56 is positively polarized in that the positive terminal 52 is electrically coupled to the casing 56 and the casing 56 has the first polarity (e.g., positive polarity). For example, the positive terminal 52 extends through the casing 56 such that the positive terminal 52 contacts the casing 56 and establishes an electrical connection with the casing 56. Moreover, the negative terminal 54 is electrically insulated from the casing 56. For example, in certain embodiments, an insulative gasket 58 is disposed about the negative terminal 54 to prevent contact between the negative terminal 54 and the casing 56.

Although the following discussion focuses on a battery casing that is positively polarized, it should be understood that in other embodiments, the casing 56 may be negatively polarized. A negatively polarized casing may include electrically coupling (e.g., via contact) the negative terminal 54 to the casing 56 and disposing the insulative gasket 58 over the positive terminal 52. In still further embodiments, the casing 56 may be neutral (e.g., not polarized), such that neither the positive terminal 52 nor the negative terminal 54 are electrically coupled to the casing 56, and the insulative gasket 58 is disposed over both the positive terminal 52 and the negative terminal 54.

In the embodiments of the battery cell 50 where the casing 56 is polarized (e.g., either positively or negatively), the battery cell may include the overcharge protection assembly 51. The overcharge protection assembly 51 may include a conductive component 60 disposed over the terminal insulated from the casing 56 (e.g., the terminal 52, 54 opposite of polarity). In other words, when the casing 56 is positively polarized, the conductive component 60 may be disposed over the negative terminal 54, and when the casing 56 is negatively polarized, the conductive component 60 may be disposed over the positive terminal 52.

As shown in the illustrated embodiment of FIG. 3, the conductive component 60 may be Z-shaped such that the conductive component includes a recess 62. The recess 62 may enable the conductive component 60 to electrically couple two components that lie on different planes. In the illustrated embodiment of FIG. 3, the recess 62 is formed between a coupling portion 64 of the conductive component 60 (e.g., the portion of the conductive component 60 that couples to the negative terminal 54) and a flange portion 66 of the conductive component 60. Accordingly, the coupling portion 64 may be positioned on a first plane and the flange portion 66 may be positioned on a second plane (e.g., parallel to the first plane). It should be noted that in other embodiments, the conductive component 60 may include any suitable shape that couples the conductive component 60 to the negative terminal 54 and also positions the conductive component 60 a suitable distance away from the casing 56.

The flange portion 66 of the conductive component 60 may be electrically insulated from the casing 56 to prevent a short circuit from occurring during normal operation of the battery cell (e.g., when the pressure in the casing 56 is below the threshold value). In certain embodiments, the flange portion 66 of the conductive component 60 may include a shape configured to contact the casing 56 (e.g., the Z shape), but an insulative component 68 may be disposed between the casing 56 and the flange portion 66 to block formation of an electrical connection between the casing 56 (e.g., when the casing 56 includes an electrically conductive material) and the conductive component 60. In other embodiments, the conductive component 60 may include a shape configured to form a gap 70 between the flange portion 66 and the casing 56 (e.g., the shape of the conductive component 60 prevents contact with the casing 56). In such embodiments, the insulative component 68 may not be included because the gap 70 may be sufficient to prevent contact between the flange portion 66 and the casing 56. However, it should be recognized that in certain embodiments, the insulative component 68 may be included when the conductive component 60 forms the gap 70. Accordingly, the insulative component 68 may be configured to fit within the gap 70 and further prevent contact between the flange portion 66 and the casing 56.

When the positive terminal 52 and the negative terminal 54 of the individual battery cell 50 come into electrical contact with one another, a short circuit may occur. A short circuit may be a low resistance connection between the positive terminal 52 and the negative terminal 54 of same the battery cell 50. Low resistance may lead to a high current flow between the terminals 52, 54, which may cause the cell 50 to discharge (e.g., a flow of current to the casing 56 and/or a conductive component positioned adjacent to the casing 56). In the event of an overcharge of the battery cell 50, an external short circuit between the positive terminal 52 and the negative terminal 54 may be desirable to avoid an internal short circuit (e.g., thermal runaway) that may permanently damage the battery cell 50. For example, discharge resulting from the external short circuit may prevent additional current from being absorbed by the internal components of the battery cell 50, and thus, avoid thermal runaway. Therefore, during overcharge, it may be desirable for the negative terminal 54 (e.g., the negative terminal of a positively polarized casing) to contact the casing 56 and generate an external short circuit (e.g., external electrical connection between the positive terminal 52 and the negative terminal 54) before thermal runaway occurs.

Figure 4:
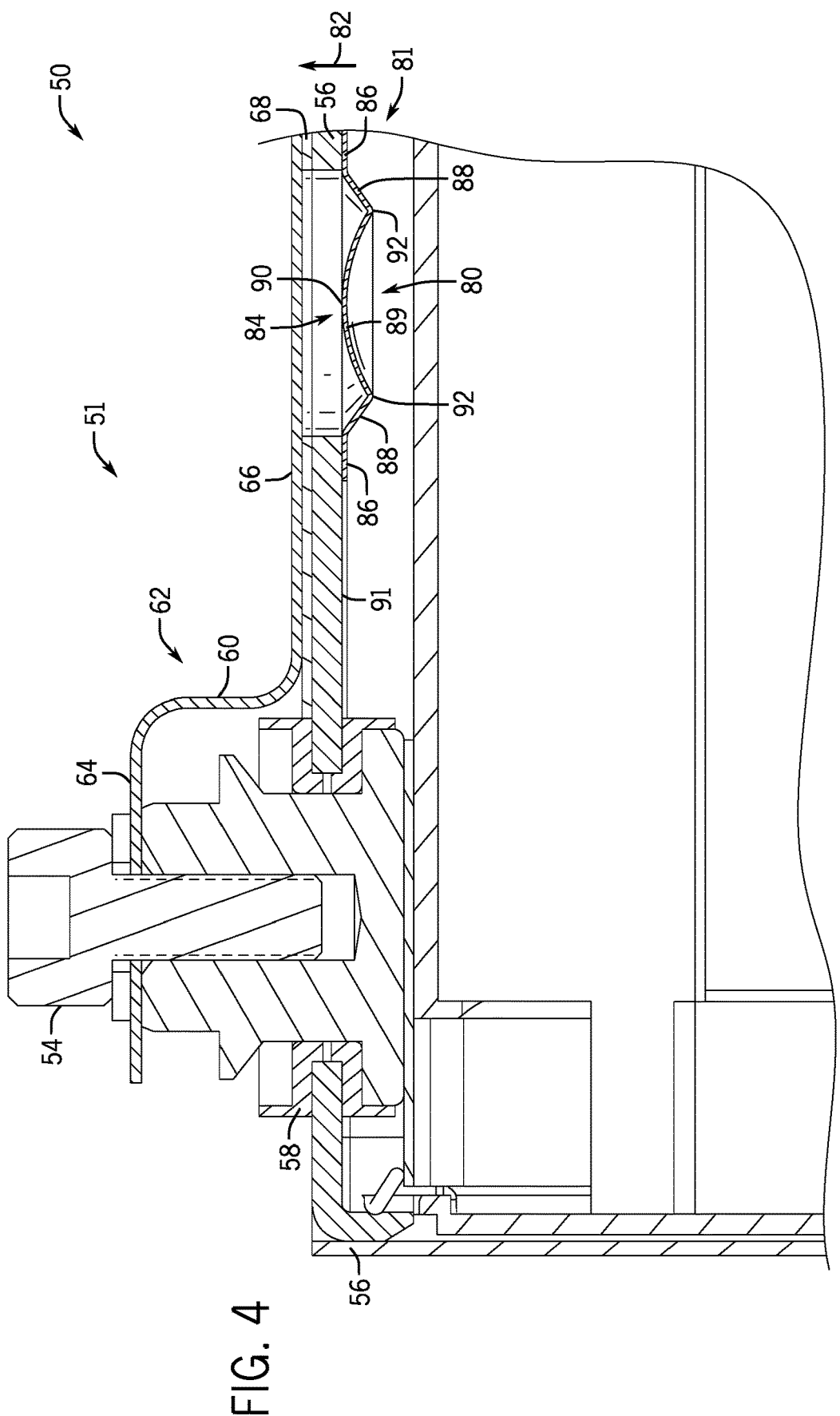
FIG. 4 is an expanded cross-sectional view of a portion of the battery cell of FIG. 3 depicting a configuration in which a vent disk of the overcharge protection assembly is in a first position, in accordance with an aspect of the present disclosure.
Figure 5:
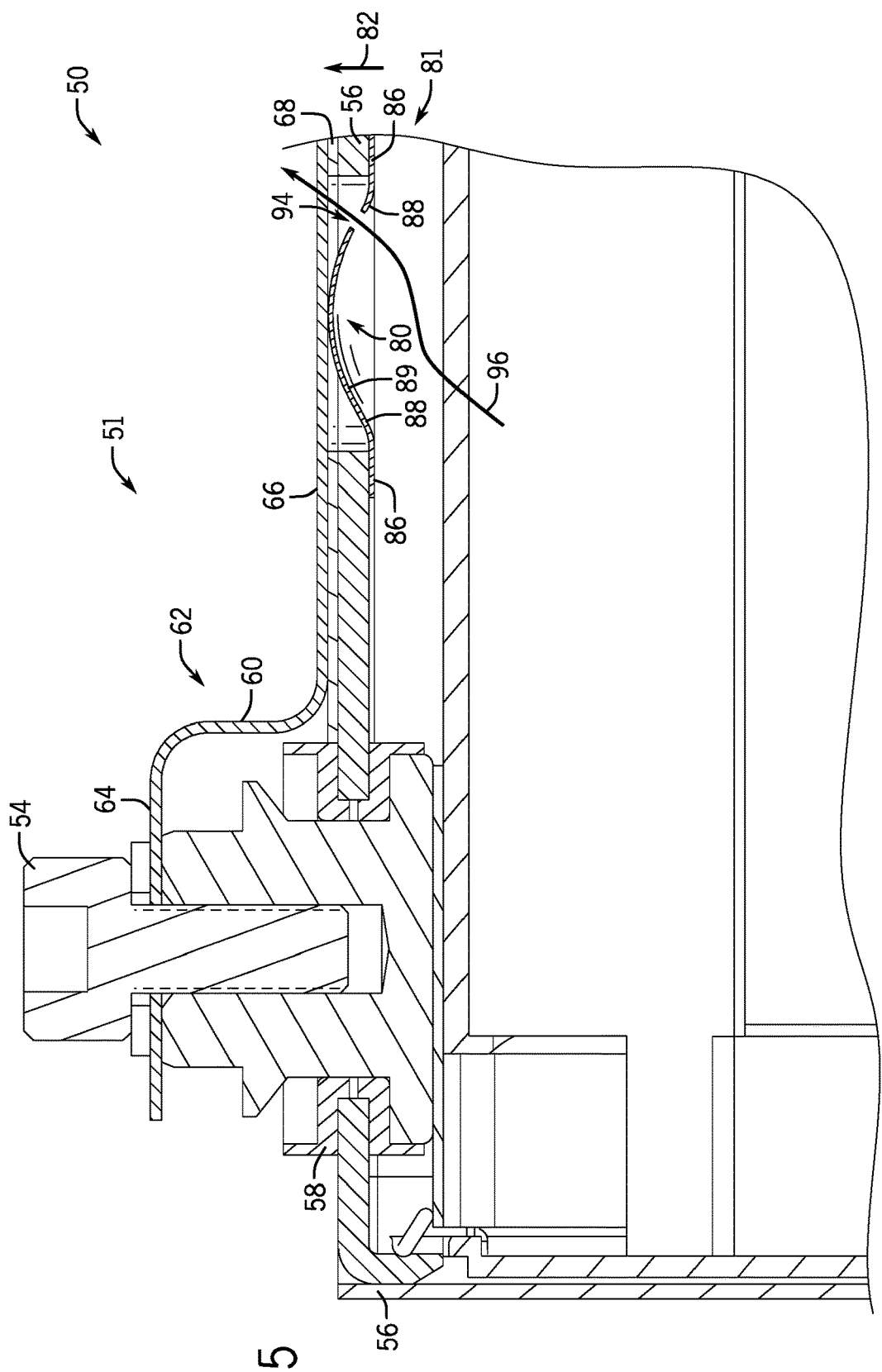
FIG. 5 is the cross-sectional view of FIG. 4, depicting a configuration in which the vent disk of the overcharge protection assembly is in a second position, in accordance with an aspect of the present disclosure.

FIGS. 4 and 5 illustrate an embodiment of the overcharge protection assembly 51 that may trigger an external short circuit and prevent thermal runaway during overcharge of the battery cell 50. In accordance with present embodiments, the external short circuit may be triggered via contact between the casing 56 and the insulated negative terminal 54 (e.g., for a positively polarized can). However, an electrical connection between the positive and/or negative terminal 52, 54 and an external load (e.g., another battery) is not disrupted (e.g., by breaking a connection between the terminal and the external load).

FIG. 4 illustrates a cross-sectional view of an embodiment of the battery cell 50 that includes the overcharge protection assembly 51. In certain embodiments, the overcharge protection assembly 51 may include a vent disk 80. The vent disk 80 may be recessed in the casing 56 of the battery cell 50. In other embodiments, the casing 56 may include a cover 81 (e.g., a lid) and the vent disk 80 may be positioned within the cover 81 of the casing 56. Additionally, in certain embodiments, the vent disk 80 may be configured to move in a direction 82 (e.g., by inverting, collapsing, or tearing) when a pressure within the battery cell 50 reaches a threshold value. For example, to produce electrical power in the battery cell 50, one or more chemical reactions may take place. In some cases, such reactions form a gas as a byproduct, and thus, the pressure within the casing 56 increases as more gas is produced. When a battery is overcharged, a temperature within the casing 56 may increase to an extent which may cause thermal runaway, which in turn, may further increase the pressure in the casing 56. In certain embodiments, the vent disk 80 may enable the gas to escape (e.g., flow out of) from the casing 56 and into a housing of the battery module 20 when the pressure reaches the threshold value. For example, the vent disk 80 may be in a first position as shown in FIG. 4 when a pressure in the casing 56 is below the threshold value. Conversely, when the pressure in the casing 56 is at or above the threshold value, the vent disk 80 may transition (e.g., invert, collapse, tear) into a second position (e.g., as shown in FIG. 5). In certain embodiments, the transition from the first position to the second position may be permanent (e.g., the vent disk 80 may not return to the first position when the pressure in the casing 56 returns to a value below the threshold value). In other embodiments, the vent disk 80 may be configured to return to the first position when the pressure in the casing 56 returns to a value below the threshold value.

As shown in the illustrated embodiment of FIG. 4, the an opening 84 is formed in both the insulative component 68 and the casing 56 enabling the vent disk 80 to move outwardly (e.g., away from the source of the gas and/or internal components of the battery cell 50) and to contact the conductive component 60 when the vent disk 80 transitions to the second position (e.g., position in FIG. 5). In certain embodiments, at least a portion of the vent disk 80 is configured to contact the conductive component 60 upon reaching the second position to establish an electrical connection between the negative terminal 54 and the casing 56, thereby creating a short circuit (e.g., when the battery cell includes a positively polarized can). As can be seen in the illustrated embodiment of FIG. 4, when the vent disk 80 is in the first position, the vent disk 80 may be disposed within the opening 84 of the insulative component 68 and the casing 56.

In certain embodiments, the vent disk 80 includes an outer ring 86, which may be coupled (e.g., electrically) to the casing 56 around an edge of the opening 84. Accordingly, the outer ring 86 may include a diameter that is greater than a diameter of the opening 84 so that the vent disk 80 covers the opening 84. Coupling the outer ring 86 to the casing 56 enables the vent disk 80 to remain coupled to the casing 56 when the vent disk 80 is in both the first position and the second position. In certain embodiments, the outer ring 86 may be physically coupled (e.g., laser welded or ultrasonic welded) to the casing 56 to form an electrical connection between the vent disk 80 and the casing 56. In other embodiments, the outer ring 86 may be electrically coupled (and physically coupled) to the casing 56 using any suitable technique that secures the vent disk 80 to the casing 56.

When in the first position, the vent disk 80 may include a recessed surface 88 whereby the vent disk 80 extends into the casing 56 (or the cover 81) through the opening 84. The vent disk 80 may also include a convex portion 89 (e.g., convex with respect to an interior of the battery cell 50). The convex portion 89 may have a top portion 90 that may be substantially flush with a bottom surface 91 of the casing 56 (e.g., the cover 81 of the casing 56) when the vent disk 80 is in the first position. In other embodiments, the convex portion 89 may be in any suitable position when the vent disk 80 is in the first position. However, when the vent disk 80 is in the first position (e.g., when the pressure in the casing is below the threshold value) the convex portion 89, and thus the vent disk 80, does not contact the conductive component 60.

The recessed surface 88 and the convex portion 89 may be connected to one another via an inner ring 92. In certain embodiments, the inner ring 92 may include a thickness that is less than a combined thickness of the recessed surface 88 and the convex portion 89. The smaller thickness of the inner ring 92 may enable a first portion of the inner ring 92 to tear such that a part of the convex portion 89 may separate from the recessed surface 88 and create an opening for trapped gas to escape from the casing 56. However, an electrical pathway between the casing 56 and the convex portion 89 may be retained via a second portion of the inner ring 92 that maintains contact between the recessed surface 88 and the convex portion 89. For example, the inner ring 92 may include a circumference that is substantially equal to a circumference of the convex portion 89. However, the first portion of the circumference of the inner ring 92 may be coined (e.g., perforated) such that it ruptures (e.g., breaks) at a lower pressure than the second portion of the inner ring 92, which may not be coined (e.g., perforated). In other words, coining located on the inner ring 92 may define a boundary between the first and second portions of the inner ring 92. Coining the first portion of the inner ring 92 may enable a portion of the convex portion 89 to tear from the recessed surface 88 and contact the conductive component 60, while the second portion of the inner ring 92 maintains contact (e.g., an electrical connection) between the convex portion 89 and the casing 56 (e.g., via the outer ring 86). Therefore, an electrical connection may be established between the conductive component 60 and the casing 56. The coining of the inner ring 92 is described in more detail below with reference to FIG. 6. In other embodiments, the inner ring 92 may be the same thickness as the recessed surface 88 and convex portion 89.

When the vent disk 80 is in the first position the vent disk 80 may cover the opening 84 such that no gas may escape from the casing 56. The gas may then accumulate within the casing and cause the pressure within the casing 56 to increase. As pressure builds in the casing 56, the vent disk 80 may move in the direction 82 (e.g., by bulging or rupturing). In certain embodiments, the vent disk 80 may move in the direction 82 as a result of inversion of the recessed surface 88 (e.g., the recessed surface 88 moves in the direction 82 from a position below the outer ring 86 to a position above the outer ring 86). Once inverted, the vent disk 80 may reach the second position, as illustrated in FIG. 5. In certain embodiments, when the recessed surface 88 inverts from the pressure buildup within the casing 56, a portion of the inner ring 92 may break (e.g., rupture or tear) as a result of tension created from the inversion. For example, the inner ring 92 may form a weak connection between the recessed surface 88 and the convex portion 89 such that a relatively small force may break the first portion of the inner ring 92 (e.g., due to the smaller thickness of the inner ring 92 or coining). Additionally, as the recessed surface 88 inverts, the inner ring 92 may be compressed and then subsequently stretched as a result of the convex portion 89 and the recessed surface 88 simultaneously moving in the direction 82. Such movement may further weaken the inner ring 92 such that the first portion of the inner ring 92 is more susceptible to breaking. Accordingly, breaking the first portion of the inner ring 92 may form a gap 94, through which gas 96 may escape from the casing 56.

It is now recognized that forming the gap 94 may be desirable so that gas 96, and thus pressure, may be released from the battery cell casing 56. For example, the battery cell 50 may incur permanent damage when the pressure in the casing 56 reaches a certain level. In certain embodiments, the threshold level of the vent disk 80 may be a predetermined pressure value that is less than a pressure that may cause permanent damage to the battery cell 50 and/or thermal runaway. The vent disk 80 of embodiments of the present disclosure may be utilized both to cause an external short circuit to prevent thermal runaway as well as to release an undesirable buildup of pressure within the casing 56.

In other embodiments, the recessed surface 88 may not be configured to invert, but to remain substantially rigid. For example, the first portion of the inner ring 92 may break as a result of pressure building and applying a force to the convex portion 89 of the vent disk. Accordingly, once the pressure in the casing 56 reaches the threshold value, the pressure applies a force upon the convex portion 89 that causes the convex portion 89 to break away from the recessed surface 88. The inner ring 92 may have a thickness that enables the convex portion 89 to break away from the recessed surface 88 at the threshold pressure. The substantially rigid recessed surface 88 is discussed in detail below with reference to FIG. 9.

When the vent disk 80 moves in the direction 82 from the pressure buildup within the casing 56, the convex portion 89 that breaks away from the recessed surface 88 may be configured to contact the conductive component 60. The contact between the convex portion 89 and conductive component 60 may create an electrical connection between the negative terminal 54 and the casing 56. Accordingly, a short circuit may result from the established electrical connection, which in certain embodiments, may lead to a discharge of the cell 50 (e.g., flow of electrical current to the casing 56 and/or another conductive component proximate to the casing 56). Therefore, in certain situations (e.g., when conducting an overcharge test), the vent disk 80 may trigger an external short circuit when the pressure in the casing 56 reaches the threshold pressure such that thermal runaway may be prevented.

Figure 6:
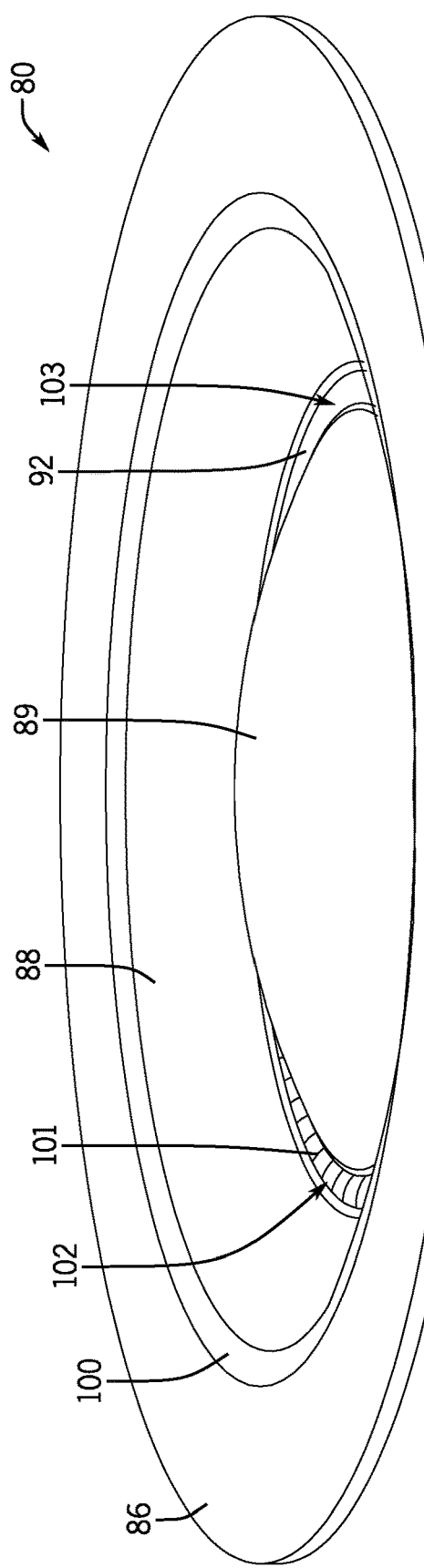
FIG. 6 is a perspective view of the vent disk of FIGS. 4 and 5, in accordance with an aspect of the present disclosure.

FIG. 6 illustrates a perspective view of the vent disk 80, in accordance with aspects of the present disclosure. As shown in the illustrated embodiment of FIG. 6, the vent disk 80 includes a connection ring 100 that couples the outer ring 86 to the recessed surface 88. In accordance with certain embodiments, a portion of the connection ring 100 may also be configured to break such that the recessed surface 88 separates from the outer ring 86 when the pressure in the casing 56 reaches the threshold value and the vent disk 80 transitions from the first position to the second position.

As shown in the illustrated embodiment of FIG. 6, the inner ring 92 includes coining 101 (e.g., perforations) that may separate a first portion 102 of the inner ring 92 (e.g., the portion that includes the coining 101) from a second portion 103 of the inner ring 92 (e.g., the portion that does not include the coining 101). Accordingly, when the pressure in the casing 56 reaches the threshold value, the first portion 102 of the inner ring 92 may tear, such that the convex portion 89 no longer contacts the recessed surface 88. However, the second portion 103 of the inner ring 92 may maintain contact between the convex portion 89 and the recessed surface 88. Therefore, when the first portion 102 tears, a segment of the convex portion 89 may contact the conductive component 60, thereby establishing an electrical connection between the conductive component 60 and the casing 56, and therefore, the positive and negative terminals 52, 54.

In certain embodiments, each component of the vent disk 80 may include the same material. For example, the components of the vent disk 80 may be a flexible metal (e.g., aluminum) that is configured to collapse, break, or tear when a desired force is applied to the vent disk 80 (e.g., to the convex portion 89). Further, the convex portion 89 and the outer ring 86 may include a conductive metal (e.g., aluminum), whereas the connection ring 100, the recessed surface 88, and/or the inner ring 92 may include another suitable material. For example, in embodiments where the recessed surface 88 is configured to remain substantially rigid, the recessed surface 88 may include a hard plastic, a metal, or any other rigid material configured to withstand the threshold pressure. Additionally, the inner ring 92 and/or the connection ring 100 may include a relatively weak material configured to break (e.g., rupture or tear) at lower pressures (e.g., the threshold pressure) than the other materials. In such embodiments when the connection ring 100, the recessed surface 88, and/or the inner ring 92 include a non-conductive component, a conductive lead may be configured to electrically couple the outer ring 86 to the convex portion 89. For example, the conductive lead may be a conductive strip of metal disposed over the connection ring 100, the recessed surface 88, and/or the inner ring 92. Accordingly, when the convex portion 89 contacts the conductive component 60 (see FIG. 5), an electrical connection is established between the casing 56 and the negative terminal 54.

Figure 7:
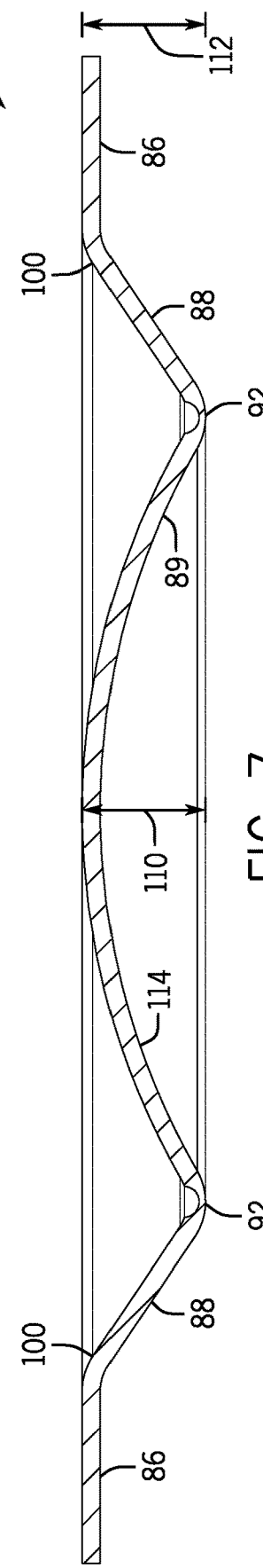
FIG. 7 is a cross sectional elevation view of the vent disk of FIGS. 4-6, in accordance with an aspect of the present disclosure.

FIG. 7 illustrates a cross section of the vent disk 80. The illustrated embodiment of FIG. 7 shows the convex portion 89 as including a height 110 that is substantially the same as a height 112 between the inner ring 92 and the outer ring 86. In other embodiments, the convex portion 89 may include any suitable height such that when the convex portion 89 breaks away from the recessed surface 88, at least a portion of the convex portion 89 contacts the conductive component 60 by an amount sufficient to create a short circuit. Additionally, the illustrated embodiment of FIG. 7 shows the convex portion 89 as including a hollow convex surface 114. Accordingly, as gas builds within the casing 56, the resulting pressure may apply a force upon the surface 114. In certain embodiments, the convex portion 89 may include an angle of curvature chosen to increase a surface area of the surface 114. Increasing or maximizing the surface area may enable the surface 114 to experience a greater overall force from the pressure in the casing 56. The surface 114 may have any suitable surface area that enables the vent disk to transition from the first position to the second position at the threshold pressure value.

FIG. 8 illustrates a side view of the vent disk 80 in the second position when the recessed surface 88 is configured to invert (e.g., the recessed surface 88 is not rigid and not able to withstand the threshold pressure). As shown in the illustrated embodiment, the gap 94 forms between the recessed surface 88 and the convex portion 89 because of a rupture of a portion of the inner ring 92. Despite the formation of the gap 94, the convex portion 89 remains electrically coupled to the outer ring 86, and in turn, the casing 56. Accordingly, when the convex portion 89 contacts the conductive component 60, an electrical pathway may be formed between the casing 56 and the negative terminal 54, and thus, between the negative terminal 54 and the positive terminal 52 (e.g., the positive terminal is electrically coupled to the casing 56 causing the casing 56 to be positively polarized).

While the illustrated embodiment of FIG. 8 shows the inner ring 92 as rupturing at a specific point, the inner ring 92 may break at any point along a circumference of the inner ring 92 depending on coining and/or other features of the inner ring 92. However, at least a portion of the inner ring 92 remains intact (e.g., couples the recessed surface 88 to the convex portion 89). Additionally, it should be noted that in other embodiments, the connection ring 100 may rupture causing a portion of the recessed surface 88 to separate from the outer ring 86. In such embodiments, the gap 94 may form between the recessed surface 88 and the outer ring 86 and/or the recessed surface 88 and convex portion 89 (e.g., either or both of the connection ring 100 and the inner ring 92 may tear). In view of the foregoing, it should be appreciated that the convex portion 89 is configured to contact the conductive component 60 when the pressure in the casing 56 reaches the threshold value, and an electrical connection remains present between the convex portion 89 and the outer ring 86 when the vent disk 80 is in the second position (e.g., the convex portion 89 contacting the conductive component 60).

FIG. 9 illustrates a side view of the vent disk 80 in the second position when the recessed surface 88 is configured to remain substantially rigid (e.g., to not collapse at the threshold pressure). In the illustrated embodiment of FIG. 9, the inner ring 92 is configured to rupture when the pressure in the casing 56 reaches the threshold value. However, the recessed surface 88 withstands the pressure, thereby causing the convex portion 89 to separate from the recessed surface 88 and to form the gap 94 between the convex portion 89 and the recessed surface 88. Accordingly, gas 96 may flow out of the casing 56 via the gap 94, thereby relieving the pressure buildup within the cell 50.

Figure 10:
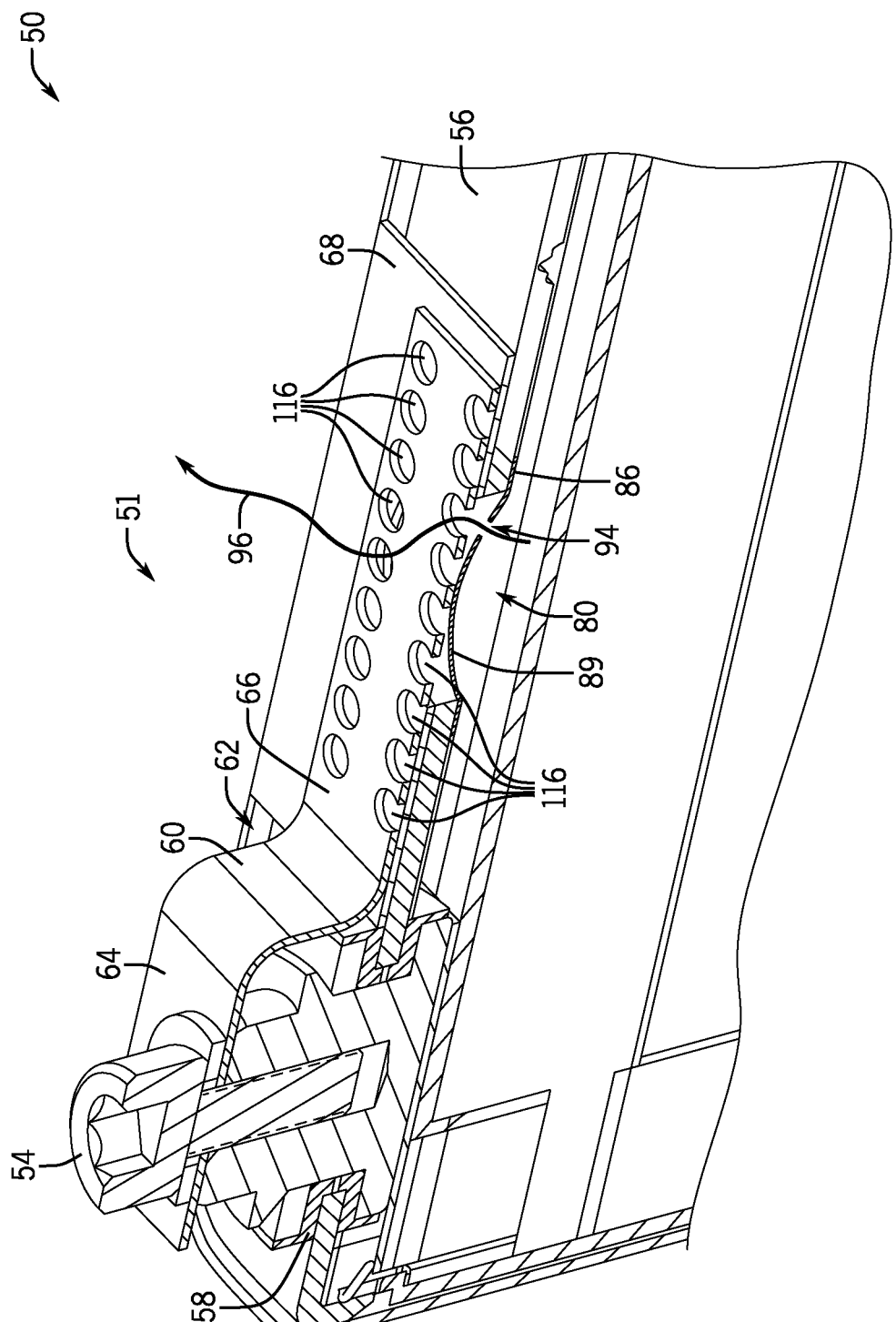
FIG. 10 is a cross-sectional perspective view of an embodiment of a conductive component of the overcharge protection assembly that includes a plurality of openings, in accordance with an aspect of the present disclosure.

In certain embodiments, the conductive component 60 may create an obstruction for gas 96 flowing out of the gap 94, which may be undesirable because the obstruction may slow a flow of the gas 96 exiting the battery cell 50. FIG. 10 illustrates an embodiment of the conductive component 60 that includes a plurality of openings 116. The openings 116 may enable the gas 96 to flow through the gap 94 of the vent disk 80 and into the housing of the battery module 20 with minimal obstruction. Additionally, the openings 116 may decrease an amount of heat transferred to the conductive component 60. Decreasing an amount of heat transferred to the conductive component 60 may mitigate damage to the conductive component 60 and/or the negative terminal 54 due to contact between the conductive component 60 and the gas 96 (e.g., battery cell effluent).

Further, the openings 116 enable gas 96 to flow into the housing of the battery module 20 while still providing a sufficient surface area for the convex portion 89 of the vent disk 80 to contact the conductive component 60 and to establish the electrical connection between the negative terminal 54 and the casing 56. Therefore, the openings 116 may be a sufficient size to enable gas 96 to pass through the conductive component 60, but not so large as to eliminate a contact area for the convex portion 89 of the vent disk 80. While the illustrated embodiment of FIG. 10 shows the openings 116 as circular holes, in other embodiments the openings 116 may be square, oval, rectangular, or any other suitable shape.

Figure 11:
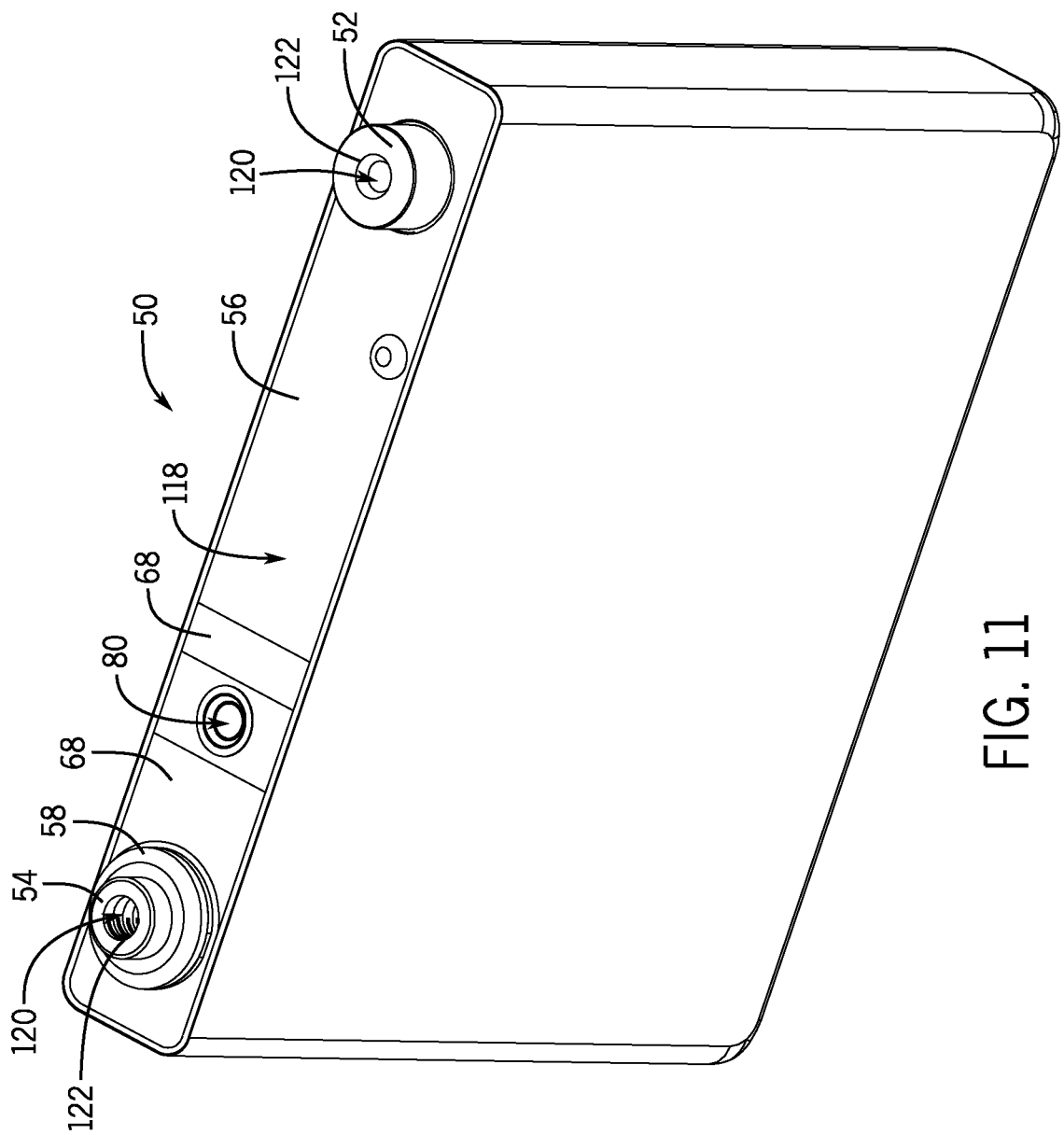
FIG. 11 is an overhead perspective view of the battery cell of FIG. 3 when the vent disk of FIGS. 4-9 is in the second position and the conductive component is removed, in accordance with an aspect of the present disclosure.

FIG. 11 illustrates a perspective view of the vent disk 80 in the second position when the conductive component 60 is removed. As shown in FIG. 11, the battery cell casing 56 is positively polarized as the positive terminal 52 is directly coupled to the casing 56. In other embodiments, the battery cell casing 56 may be negatively polarized such that the negative terminal 54 is directly coupled to the casing 56 and the positive terminal 52 is insulated from the casing 56 via the insulative gasket 58. Additionally, FIG. 11 shows the insulative component 68 disposed over a surface 118 of the casing 56. As described above, the insulative component 68 may block the conductive component 60 from contacting the casing 56 when the battery cell 50 is operating under normal conditions (e.g., below the threshold pressure value when the vent disk 80 has not deployed).

Additionally, the positive terminal 52 and the negative terminal 54 each have an opening 120. In certain embodiments, the opening 120 may include threading 122 configured to receive a screw or bolt. The opening 120 may enable the battery cell 50 to be coupled to other battery cells. Additionally, the opening may enable other components (e.g., the conductive component 60) to be coupled to one of the terminals 52, 54.

Figure 12:
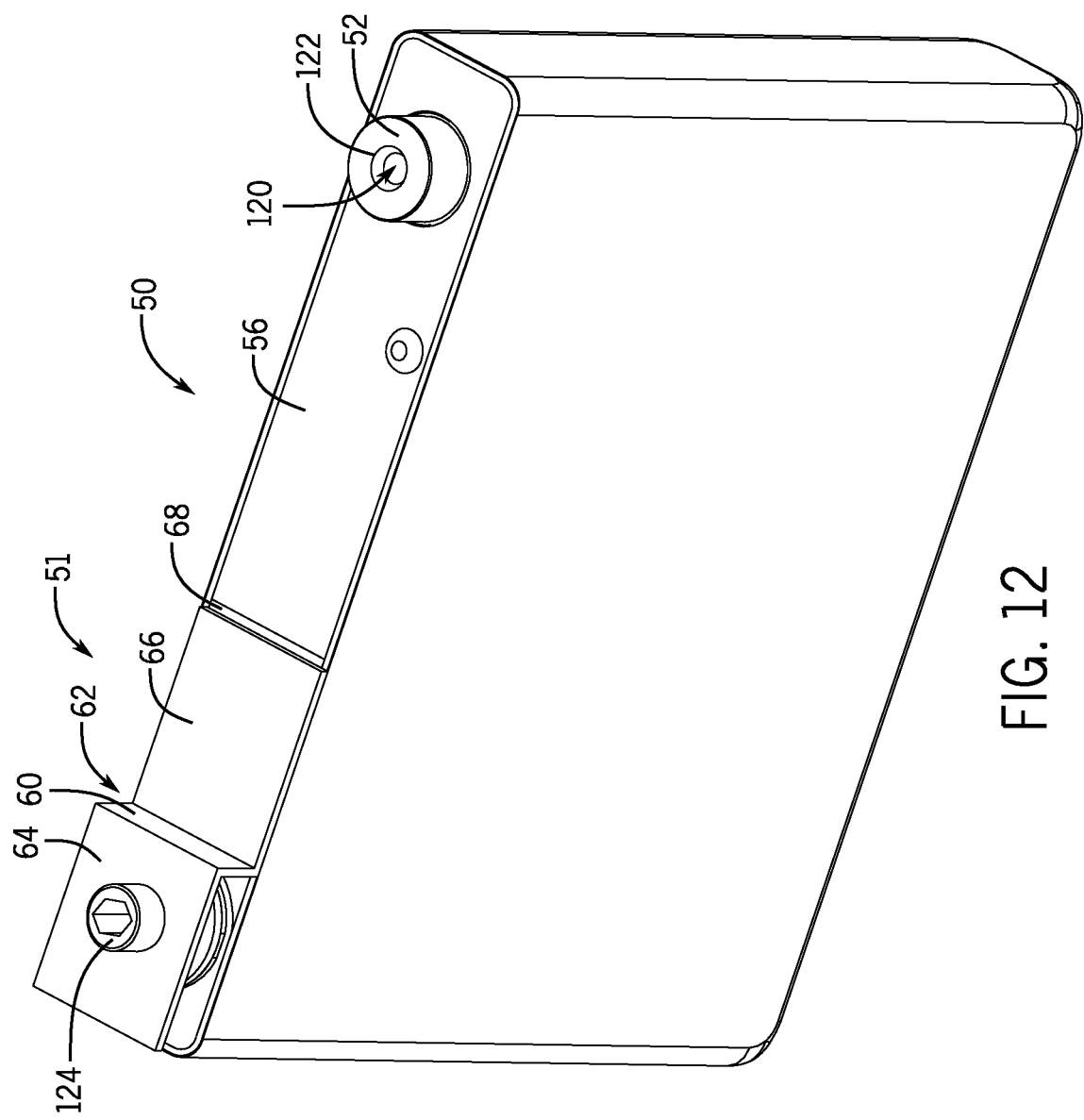
FIG. 12 is a perspective view of the battery cell of FIG. 11 with the conductive component attached to the negative terminal of the battery cell, in accordance with an aspect of the present disclosure.

FIG. 12 illustrates a perspective view of the battery cell 50 of FIG. 11 with the conductive component 60 attached to the negative terminal 54. In the illustrated embodiment of FIG. 12, the conductive component 60 is coupled to the negative terminal 54 via a screw 124. Therefore, in certain embodiments, the conductive component 60 may include an opening that enables the screw 124 or a bolt to pass through the conductive component 60 and into the opening 120 of the negative terminal 54. Accordingly, the screw 124 may secure the conductive component 60 to the negative terminal 54 via the threading 122 within the opening 120 of the negative terminal 54. In other embodiments, the conductive component 60 may be coupled to the negative terminal 54 via another type of fastener, a weld, or another suitable technique that secures and electrically couples the conductive component 60 to the negative terminal 54. In such embodiments, the battery cell 50 may not include the screw 124 and the conductive component 60 may not include the opening to receive the screw 124.

Additionally, the illustrated embodiment of FIG. 12 shows the Z-shape of the conductive component 60. The conductive component 60 may include the recess 62 that enables the conductive component 60 to couple two components positioned in different planes. For example, the conductive component 60 is coupled to the negative terminal 54 and positioned a sufficient distance from the vent disk 80 to ensure contact when the vent disk 80 transitions to the second position.

Figure 13:
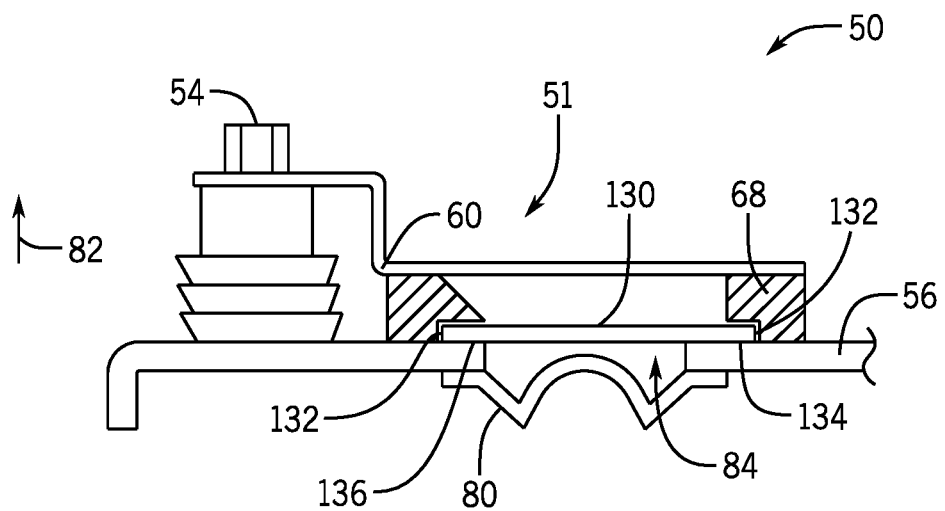
FIG. 13 is a cross-sectional view of another embodiment of the overcharge protection assembly that includes an intermediate conductive component and the vent disk is in the first position, in accordance with an aspect of the present disclosure.
Figure 14:
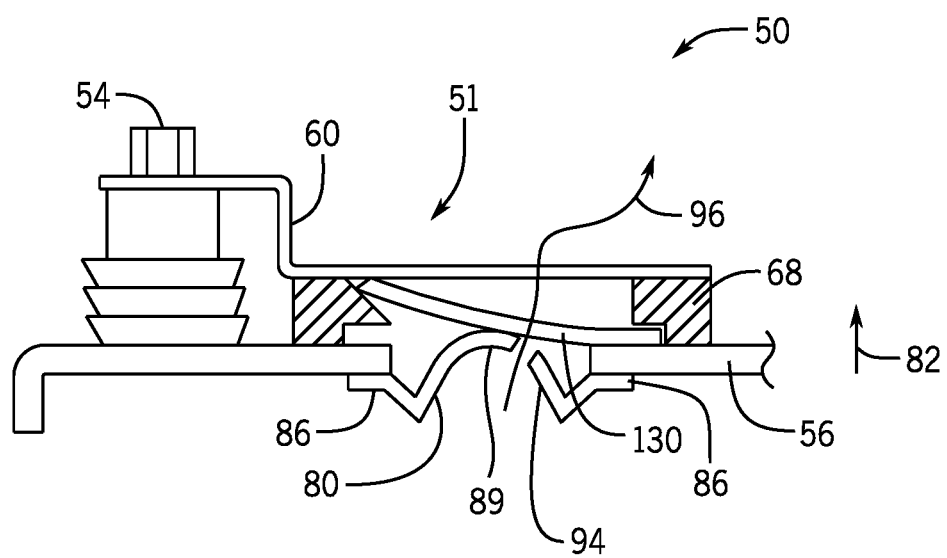
FIG. 14 is a cross-sectional side view of the overcharge protection assembly of FIG. 13 when the vent disk is in the second position, in accordance with an aspect of the present disclosure.

In some cases, the vent disk 80 may be too short to contact the conductive component 60 and establish an electrical connection between the conductive component 60 and the casing 56. An intermediate conductive component may be utilized when the vent disk 80 itself cannot make sufficient contact with the conductive component 60 and avoid issues related to the electrolyte vapor encountering an external short that could damage components of present embodiments. For example, the intermediate conductive component may block gas from contacting the external short circuit because the gap 94 in the vent disk 80 and a contact area of the external short circuit are on opposite sides of the intermediate conductive component. FIGS. 13 and 14 illustrate an embodiment of the cell 50 that includes the vent disk 80, the conductive component 60, as well as an intermediate conductive component 130. In the illustrated embodiment of FIG. 13, the casing 56 is positively polarized (e.g., the positive terminal 52 is directly or indirectly physically and electrically coupled to the casing 56). However, it should be noted that the casing 56 may also be negatively polarized (e.g., the negative terminal 54 may be directly or indirectly physically and electrically coupled to the casing 56 and the positive terminal may be electrically insulated from the casing 56). When the casing 56 is negatively polarized, the conductive component 60 would be disposed over the positive terminal 52 rather than the negative terminal 54.

Additionally, the embodiment of FIG. 13 shows the intermediate conductive component 130 disposed between the vent disk 80 and the conductive component 60 and over the opening 84. In certain embodiments, the intermediate conductive component 130 may be disk-shaped and fully cover the opening 84. In other embodiments, the intermediate conductive component 130 may be a rectangular shape that covers a portion of, or all of, the opening 84. In still further embodiments, the intermediate conductive component 130 may be any suitable shape that contacts the conductive component 60 when the vent disk 80 moves from the first position to the second position, but not before. In other words, the intermediate conductive component 130 may not contact the conductive component 60 when the vent disk 80 is in the first position, but may be urged into contact with the conductive component 60 when the vent disk 80 is in the second position (e.g., when the disk 80 transitions to the second position). Further, the intermediate conductive component 130 may be disposed within grooves 132 of the insulative component 68. In other embodiments, the intermediate conductive component 130 may not contact the insulative component 68 at all. The intermediate conductive component 130 may include a thickness that is less than a thickness of the insulative component 68 so that the intermediate conductive component 130 is driven into contact with the conductive component 60 by the vent disk 80 (e.g., the intermediate conductive component 130 is not constantly in contact with the conductive component 60).

In certain embodiments, the intermediate conductive component 130 may be any flexible metal (e.g., aluminum, nickel plated copper, steel, or another metal) that may establish an electrical connection when in contact with the conductive component 60. In other embodiments, the intermediate conductive component 130 may include aluminum.

In certain embodiments, the intermediate conductive component 130 may be disposed directly on the casing 56 and a first edge 134 of the intermediate conductive component 130 may be electrically coupled to the casing 56 (e.g., via a laser weld, another weld, or any other suitable technique that electrically couples the intermediate conductive component 130 to the casing 56). A second edge 136 of the intermediate conductive component 130 may remain unfixed to the casing 56 such that the second edge 136 of the intermediate conductive component 130 may move in the direction 82 when the vent disk 80 moves in the direction 82. In other embodiments, the intermediate conductive component 130 may be disposed in any other suitable location so long as it is configured to make sufficient contact with the conductive component 60 when the vent disk 80 is in the second position.

FIG. 14 illustrates a cross-sectional side view of the battery cell 50 having the intermediate conductive component 130 when the vent disk 80 is in the second position. As shown in the illustrated embodiment of FIG. 14, when the vent disk 80 transitions to the second position, the vent disk 80 not only creates the gap 94 enabling gas 96 to escape from the casing 56, but the vent disk 80 contacts and urges the intermediate conductive component 130 in the direction 82. The intermediate conductive component 130 may contact the conductive component 60 to establish an electrical pathway between the casing 56 and the negative terminal 54. For example, electrical current may flow from the negative terminal 54, to the conductive component 60, to the intermediate conductive component 130, to the convex portion 89 of the vent disk 80, to the outer ring 86 of the vent disk 80, and to the casing 56. Accordingly, an electrical connection is established between the positive terminal 52 and the negative terminal 54, thereby creating an external short circuit when the pressure in the casing 56 reaches the threshold value. The external short circuit may be triggered via an electrical connection between the casing 56 and the insulated negative terminal 54. However, an electrical connection between the positive and/or negative terminal 52, 54 and an external load (e.g., another battery) is not disrupted (e.g., by breaking a connection between the terminal and the external load).

Figure 15:
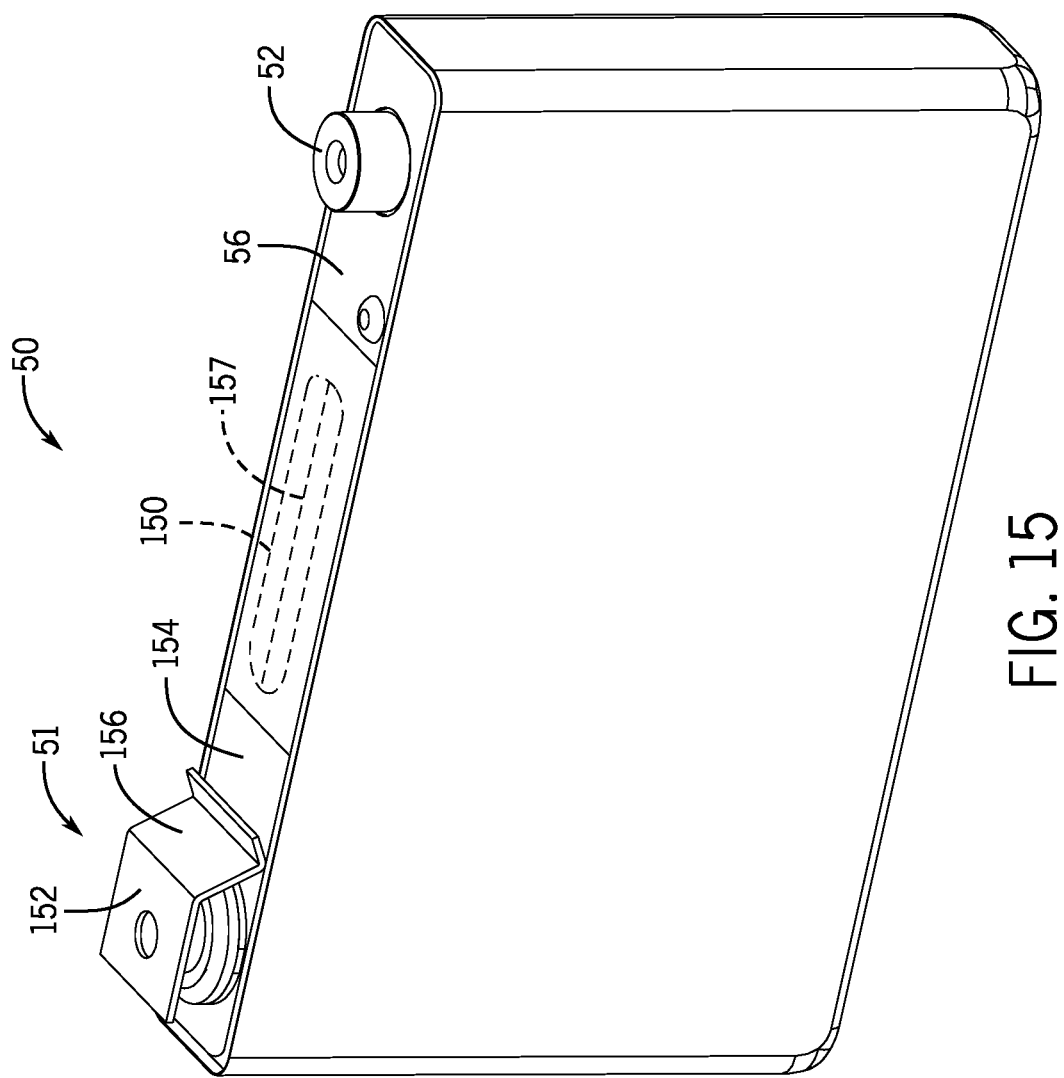
FIG. 15 is a perspective view of another embodiment of the overcharge protection assembly that includes a vent flap in a first position, in accordance with an aspect of the present disclosure.
Figure 16:
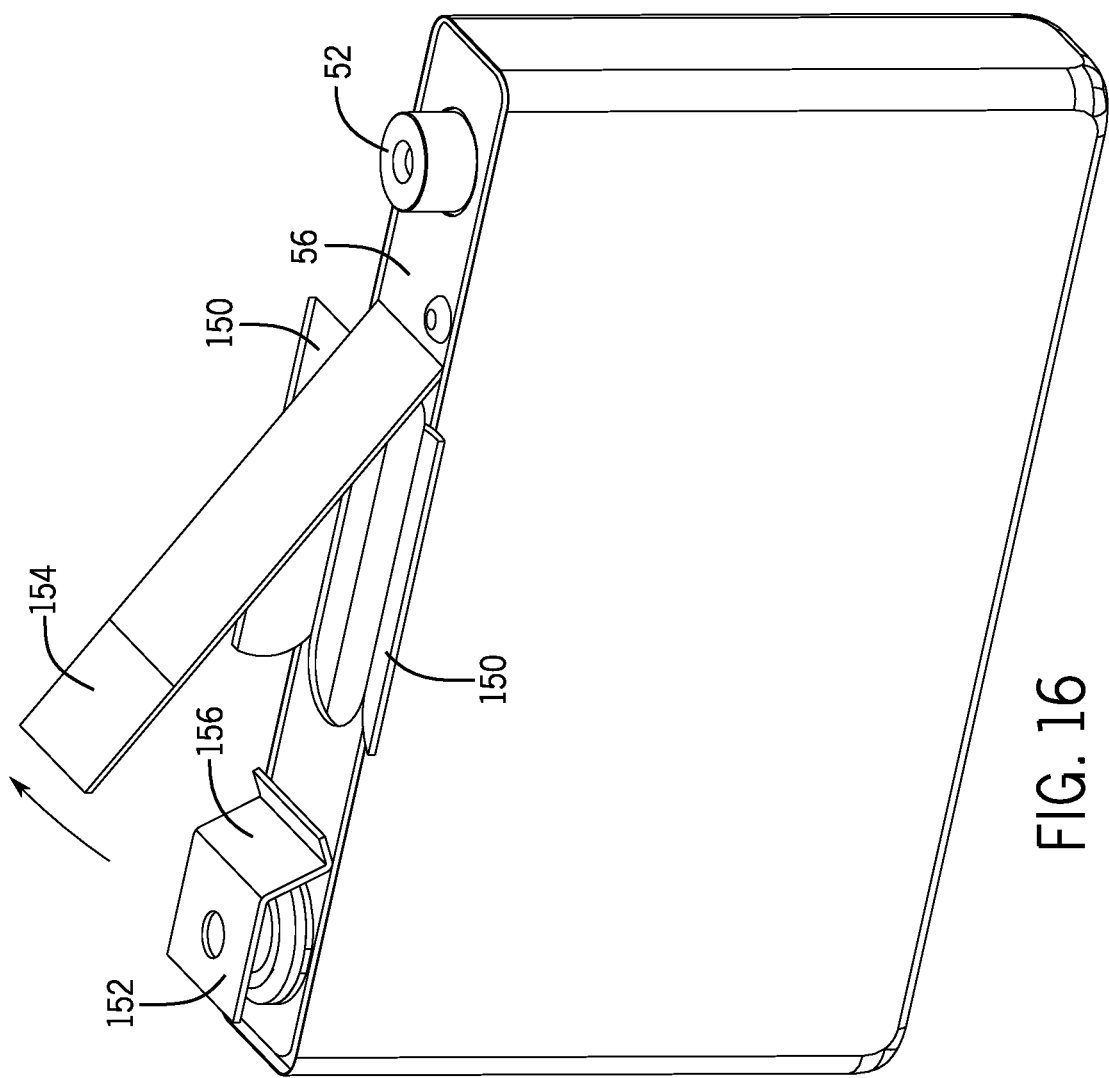
FIG. 16 is a perspective view of the overcharge protection assembly of FIG. 15 with the vent flap in a second position, in accordance with an aspect of the present disclosure.

In some cases, the battery cell 50 may not include the vent disk 80. Rather, in certain embodiments, the battery cell 50 may include a vent flap 150 as shown in FIGS. 15 and 16. Accordingly, the embodiments of the overcharge protection assembly 51 discussed above with respect to FIGS. 3-14 may not be suitable for creating an external short when the pressure in the casing reaches the threshold value. Therefore, another configuration of the overcharge protection assembly 51 may be utilized when the battery cell 50 includes the vent flap 150 rather than the vent disk 80.

FIG. 15 is a perspective view of the battery cell 50 having the vent flap 150. As shown in the illustrated embodiment of FIG. 15, the battery cell 50 also includes the overcharge protection assembly 51, which includes a conductive spring 152 and a second insulative component 154. While the battery cell casing 56 of FIG. 15 is positively polarized, the present embodiment may also be utilized for a negatively polarized battery cell casing. The conductive spring 152 may be coupled to the terminal opposite of polarity (e.g., the negative terminal 54 for a positively polarized casing or the positive terminal 52 for a negatively polarized casing). As shown in the illustrated embodiment of FIG. 15, the conductive spring 152 is coupled to the negative terminal 54. In certain embodiments, the conductive spring 152 may be coupled to the negative terminal 54 via a fastener (e.g., screw or bolt). In other embodiments, the conductive spring 152 may be welded (e.g., laser welded) to the negative terminal 54. In still further embodiments, the conductive spring 152 may be secured to the negative terminal 54 using any other suitable device for establishing an electrical connection between the negative terminal 54 and the conductive spring 152.

Additionally, the conductive spring 152 may include a conductive metal (e.g., aluminum or copper) shaped to bias the conductive spring 152 toward the casing 56. For example, when the conductive spring 152 is coupled to the negative terminal 54, a recessed portion 156 of the conductive spring 152 may contact the casing 56. Such contact may be sufficient to establish an electrical connection between the negative terminal 54 and the casing 56, and thus, between the negative terminal 54 and the positive terminal 52.

To avoid establishing such an electrical connection during normal operation of the battery cell 50 (e.g., when the pressure in the casing 56 is below the threshold value), the second insulative component 154 may be disposed between the recessed portion 156 of the conductive spring 152 and the casing 56. The second insulative component 154 may include any material (e.g., plastic, ceramic, or another non-conductive material) configured to prevent electrical current from flowing through the second insulative component 154. Therefore, during normal operation of the battery cell 50, the second insulative component 154 may block formation of the electrical connection between the negative terminal 54 (e.g., via the conductive spring 152) and the casing 56.

FIG. 16 illustrates a perspective view of the battery cell 50 including the vent flap 150 when a pressure in the casing 56 reaches the threshold value. When the pressure in the casing 56 reaches the threshold value, the vent flap 150 may be configured to open as shown in FIG. 16. Therefore, during normal operation when pressure is below the threshold, the vent flap 150 may be biased toward a closed position (e.g., the position shown in FIG. 15). When the pressure in the casing 56 reaches the threshold value, the pressure force may be sufficient to overcome a biasing force of the vent flap 150 and urge the vent flap 150 to the open position (e.g., the position shown in FIG. 16). In certain embodiments, the vent flap 150 may include a dual-door configuration such that the vent flap 150 opens down a crease 157 (e.g., shown in FIG. 15) in a center of the vent flap 150 (e.g., as if the vent flap 150 is connected to the casing 56 via two hinges, one for each door). In other embodiments, the vent flap 150 may be configured to open as if connected to the casing 56 via a hinge. In still further embodiments, the vent flap 150 may be configured to open in any suitable manner that may move the second insulative component 154 from between the conductive spring 152 and the casing 56.

Accordingly, when the pressure in the casing 56 reaches the threshold value, the vent flap 150 may move to the open position and move the second insulative component 154 such that it no longer is positioned between the conductive spring 152 and the casing 56. When the second insulative component 154 is moved by the vent flap 150, the conductive spring 152 may contact the casing 56 and establish an electrical connection between the negative terminal 54 and the casing 56, and thus, between the negative terminal 54 and the positive terminal 52 (e.g., for a positively polarized casing). As discussed above, the electrical connection may cause a short circuit, which may lead to a discharge of electrical current from the cell 50. Such an external short circuit may avoid thermal runaway within the battery cell 50 when the battery cell 50 is overcharged (e.g., during an overcharge test). The external short circuit may be triggered via contact between the casing 56 and the insulated negative terminal 54. However, an electrical connection between the positive and/or negative terminal 52, 54 and an external load (e.g., another battery) is not disrupted (e.g., by breaking a connection between the terminal and the external load).

Figure 17:
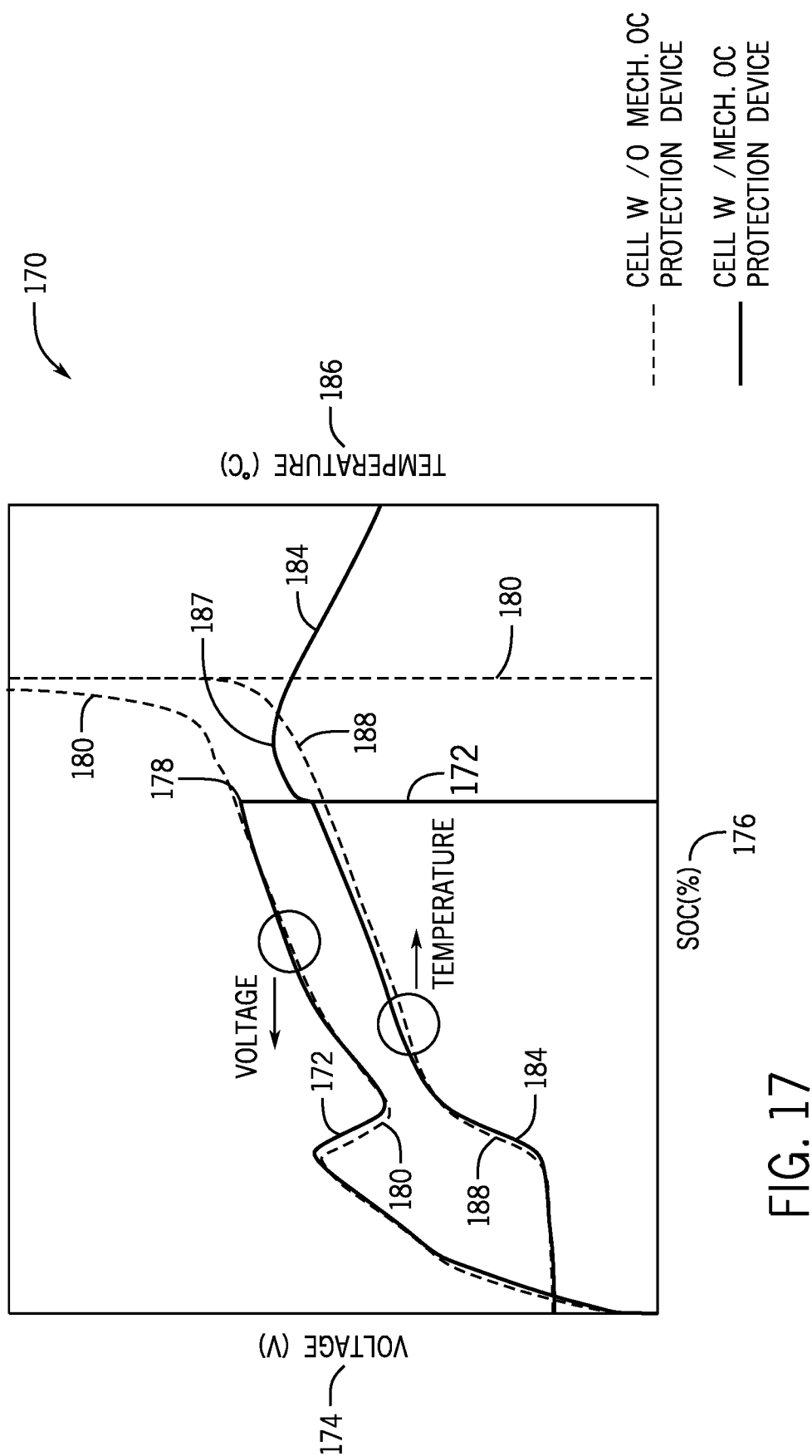
FIG. 17 is a graphical representation of results from an overcharge test performed on a battery cell utilizing an overcharge protection assembly, in accordance with an aspect of the present disclosure.

FIG. 17 illustrates a graphical representation 170 of data from an overcharge test performed on a battery cell utilizing an overcharge protection assembly of the present disclosure. The graph 170 includes a first curve 172 representing voltage 174 as a function of state of charge (SOC) 176 for a battery cell that includes the overcharge protection assembly. The first curve 172 shows how voltage 174 generally increases as SOC 176 increases for the battery cell including the overcharge protection assembly. However, as SOC 176 continues to increase, the pressure in the casing 56 of the battery cell also increases. As shown in the illustrated embodiment of FIG. 17, when the pressure reaches the threshold value, the overcharge protection assembly triggers an external short circuit by creating an electrical connection between the positive terminal 52 and the negative terminal 54 via the casing 56. This is depicted at point 178 where the short circuit occurs and the voltage 174 of the battery cell decreases significantly. Accordingly, the battery cell 50 discharges, thereby preventing thermal runaway.

Conversely, a second curve 180 shows an effect on a battery cell that does not include an overcharge protection assembly of the present disclosure. Accordingly, the voltage 174 continues to increase beyond the point 178 as the SOC 176 increases. Eventually, thermal runaway occurs. Additionally, the graph 170 illustrates a third curve 184 representing a temperature 186 as a function of SOC 176 for a battery cell that includes the overcharge protection assembly. As shown, the temperature 186 also increases as SOC 176 increases. Additionally, at the point 178 (e.g., when the external short circuit is triggered), the temperature 186 continues to increase. However, the temperature 186 does not incur a significant spike. Rather, the temperature 186 increases to a maximum point 187, and eventually decreases. Accordingly, thermal runaway does not occur.

Conversely, a fourth curve 188 illustrates the temperature 186 of a battery cell that does not include the overcharge protection assembly. As shown, the temperature 186 incurs a large increase where the voltage 174 spikes as a result of thermal runaway. Accordingly, the excessive temperature experienced by the battery cell may create permanent damage to the battery cell. Therefore, it is now recognized that the overcharge protection assembly of the present disclosure may prevent thermal runaway and may prevent permanent damage to the battery cell.

One or more of the disclosed embodiments, alone or in combination, may provide one or more technical effects useful in the manufacture of battery modules, and portions of battery modules. The disclosed embodiments relate to battery cells that include an overcharge protection assembly. The overcharge protection assembly may include a vent that opens (e.g., transitions from a first position to a second position) when a pressure in a casing of the battery cell reaches a threshold value. Accordingly, the opening of the vent may enable electrical contact between an insulated terminal and the battery cell casing, which may create an external circuit by electrically coupling the positive terminal and the negative terminal of the battery cell. Such an external short circuit may discharge the battery cell, but the external short circuit may prevent thermal runaway and/or permanent damage to the battery cell. Moreover, such an external short circuit may be triggered without disrupting electrical current from an external load to the positive and/or negative terminal. Therefore, a current capacity of the battery cell may not decrease. It should be noted that the embodiments described in the specification may have other technical effects and can solve other technical problems.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. A battery module, comprising:
   a plurality of battery cells disposed in a housing, wherein each of the plurality of battery cells comprises a casing having an electrically conductive material, a first terminal electrically coupled to the casing, a second terminal, a vent, a conductive spring electrically coupled to the second terminal, and an insulative component disposed between the conductive spring and the casing;
   wherein the vent is configured to vent a gas from the casing into the housing and to urge the insulative component from between the conductive spring and the casing such that the conductive spring electrically contacts the casing when a pressure in the casing exceeds a threshold value.

2. The battery module of claim 1, wherein the vent comprises a dual door configuration.

3. The battery module of claim 1, wherein the conductive spring is coupled to the second terminal via a screw.

4. The battery module of claim 1, wherein the conductive spring is configured to be biased toward the casing.

5. The battery module of claim 1, wherein a fastener electrically couples the conductive spring to the second terminal.

* * * * *